(12) United States Patent
Ikeda

(10) Patent No.: US 12,092,930 B2
(45) Date of Patent: Sep. 17, 2024

(54) DISPLAY DEVICE

(71) Applicant: Japan Display Inc., Tokyo (JP)

(72) Inventor: Masataka Ikeda, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/505,329

(22) Filed: Nov. 9, 2023

(65) Prior Publication Data

US 2024/0160066 A1    May 16, 2024

(30) Foreign Application Priority Data

Nov. 10, 2022   (JP) ................................. 2022-180583

(51) Int. Cl.
*G02F 1/1343*   (2006.01)
*G02F 1/1334*   (2006.01)

(52) U.S. Cl.
CPC ...... *G02F 1/134336* (2013.01); *G02F 1/1334* (2013.01); *G02F 1/134318* (2021.01)

(58) Field of Classification Search
None
See application file for complete search history.

(56) References Cited

U.S. PATENT DOCUMENTS

| | | | | |
|---|---|---|---|---|
| 2002/0033927 A1* | 3/2002 | Mun | ................... | G02F 1/13394 349/156 |
| 2003/0160927 A1* | 8/2003 | Miyachi | ................ | G02F 1/1393 349/129 |
| 2005/0231672 A1* | 10/2005 | Liu | ........................ | G02F 1/1393 349/139 |
| 2008/0036932 A1* | 2/2008 | Lee | ................... | G02F 1/133707 349/126 |
| 2011/0242477 A1* | 10/2011 | Iwamoto | ........... | G02F 1/134309 349/158 |
| 2022/0026752 A1 | 1/2022 | Okuyama | | |

FOREIGN PATENT DOCUMENTS

JP     2020177080 A   * 10/2020   ....... G02F 1/136286

* cited by examiner

*Primary Examiner* — Shan Liu
(74) *Attorney, Agent, or Firm* — Maier & Maier, PLLC

(57) ABSTRACT

A display device includes a pixel electrode layer in which a plurality of pixel electrodes is arranged in a first direction and a second direction crossing the first direction, a first substrate including a first surface and a second surface on which the pixel electrode layer is arranged, a second substrate including a third surface arranged to face the second surface, a common electrode layer arranged on the third surface, and a liquid crystal layer arranged between the common electrode layer and the pixel electrode layer. Each of the plurality of pixel electrodes includes a plurality of first openings.

5 Claims, 26 Drawing Sheets

DISPLAY DEVICE

CROSS-REFERENCE TO RELATED APPLICATIONS

This application claims the benefit of priority to Japanese Patent Application No. 2022-180583 filed on Nov. 10, 2022, the entire contents of which are incorporated herein by reference.

FIELD

An embodiment of the present invention relates to a display device.

BACKGROUND

In recent years, a polymer-dispersed liquid crystal type (PDLC type) display device (hereinafter referred to as a PDLC display device) has attracted attention. The PDLC display device includes a common electrode and a plurality of pixels each including a pixel electrode. The PDLC is arranged between the common electrode and the plurality of pixel electrodes. For example, when no voltage is applied to the common electrode and the plurality of pixel electrodes, the PDLC transmits light (in a transparent state), and when a voltage is applied to the common electrode and the plurality of pixel electrodes, the PDLC scatters light (in a scattered state). The PDLC display device can realize a wide viewing angle without using a polarization plate.

SUMMARY

A display device includes a pixel electrode layer in which a plurality of pixel electrodes is arranged in a first direction and a second direction crossing the first direction, a first substrate including a first surface and a second surface on which the pixel electrode layer is arranged, a second substrate including a third surface arranged to face the second surface, a common electrode layer arranged on the third surface, and a liquid crystal layer arranged between the common electrode layer and the pixel electrode layer. Each of the plurality of pixel electrodes includes a plurality of first openings.

DESCRIPTION OF EMBODIMENTS

Figure 1:
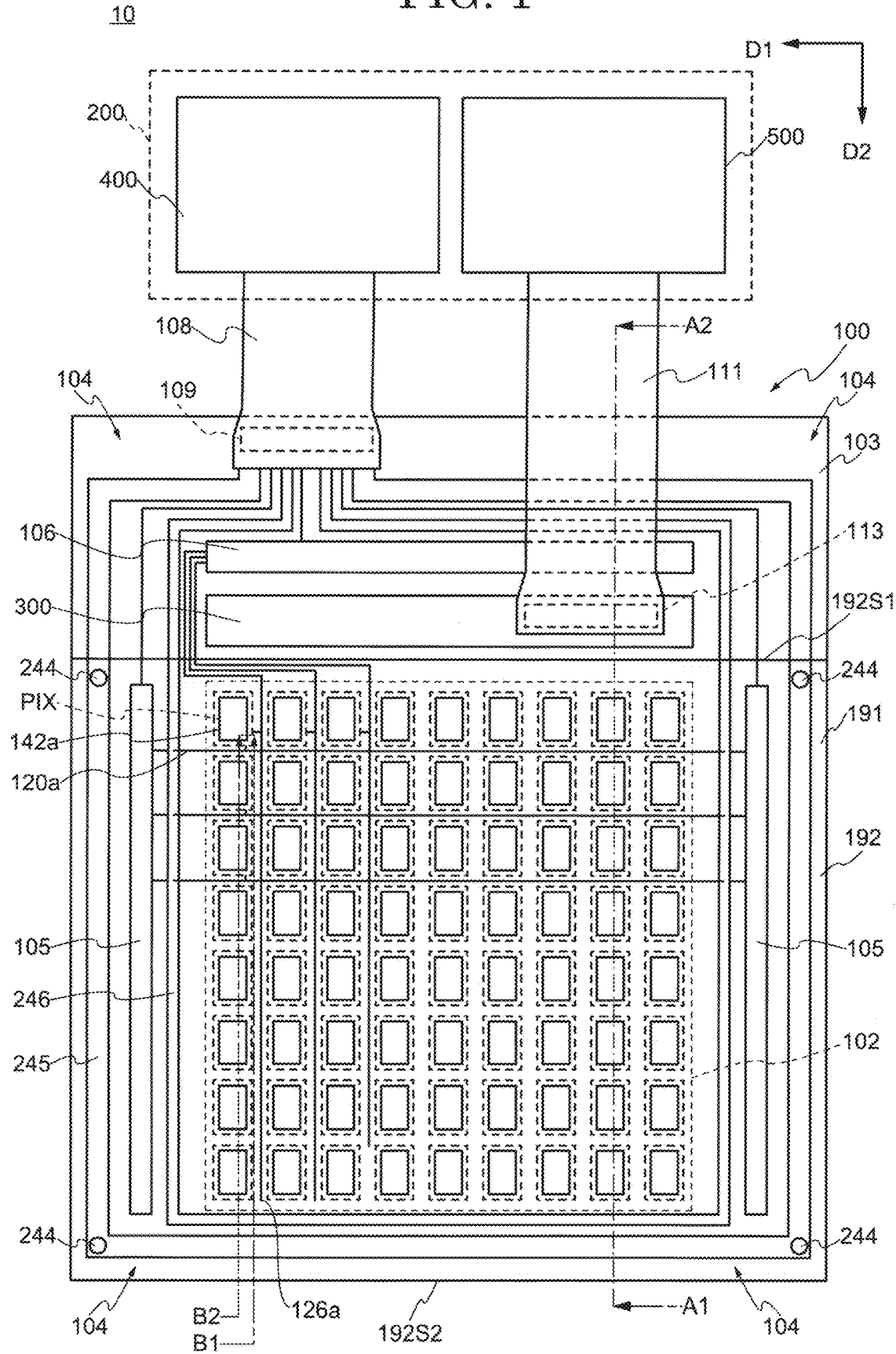
FIG. 1 is a plan view showing a configuration of a display device according to a first embodiment of the present invention.

Hereinafter, embodiments of the present invention will be described with reference to the drawings and the like. However, the present invention can be implemented in many different aspects, and should not be construed as being limited to the description of the embodiments exemplified below. Further, in the drawings, widths, thicknesses, shapes, configurations, and the like of the respective portions may be schematically represented in comparison with the actual embodiments for clarity of the description, but the drawings are merely examples, and do not limit the interpretation of the present invention. In addition, in the present specification and the drawings, upper or lower case letters are used to distinguish each of a plurality of identical or similar configurations. The terms "first" and "second" appended to each element are convenience signs used to distinguish each element, and do not have any further meaning unless otherwise specified.

Further, in the detailed description of the present invention, the terms "above" and "below" may be used to describe the positional relationship between a certain component and another component. The terms "above" and "below" include not only the case where a certain component is positioned directly above or directly below a certain component, but also the case where another component is interposed therebetween unless otherwise specified.

In the detailed description of the present invention, the same, matching, parallel, and perpendicular designations may be used, and the same, matching, parallel, and perpendicular designations may include the case where errors within the scope of the design are included.

A display panel included in a display device according to an embodiment of the present invention is assumed to be a liquid crystal display panel using a polymer-dispersed liquid crystal as an example.

In some embodiments described below, a display device capable of suppressing a decrease in light transmittance or a decrease in brightness is exemplified.

1. First Embodiment

[1-1. Configuration of Display Device 10]

Figure 2:
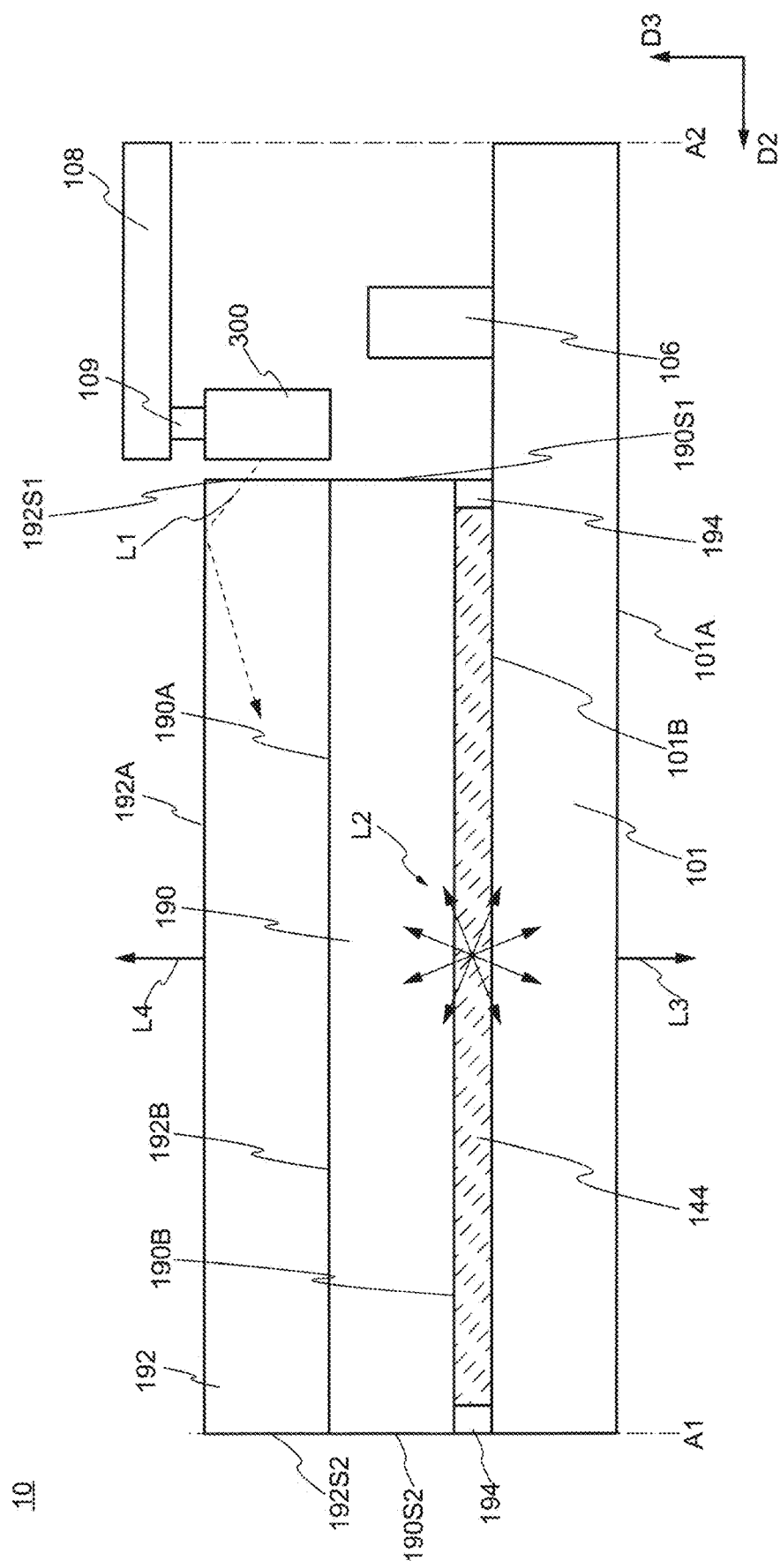
FIG. 2 is a cross-sectional view showing a cross-sectional structure of a display device along a line A1-A2 of FIG. 1.

FIG. 1 is a schematic plan view showing a configuration of a display device 10. FIG. 2 is a cross-sectional view showing a cross-sectional structure along a line A1-A2 shown in FIG. 1.

As shown in FIG. 1, the display device 10 includes a display panel 100, a flexible printed circuit board 108, a flexible printed circuit board 111, a substrate 192, a control device 200, and a lighting equipment 300.

[1-1-1. Configuration of Display Panel 100]

As shown in FIG. 1, the display panel 100 is roughly classified into a display region 102 and a peripheral region 104. The peripheral region 104 is arranged to surround the display region 102. The peripheral region 104 is a region between the display region 102 and an end portion of a first substrate 103 on the first substrate 103. In other words, the peripheral region 104 is a region other than the region where the display region 102 is arranged on the first substrate 103. One direction of a plane in the display panel 100 is a direction D1, a direction orthogonal to the direction D1 is a direction D2, and a direction orthogonal to a D1-D2 plane is a direction D3, in the display panel 100.

Figure 12A:
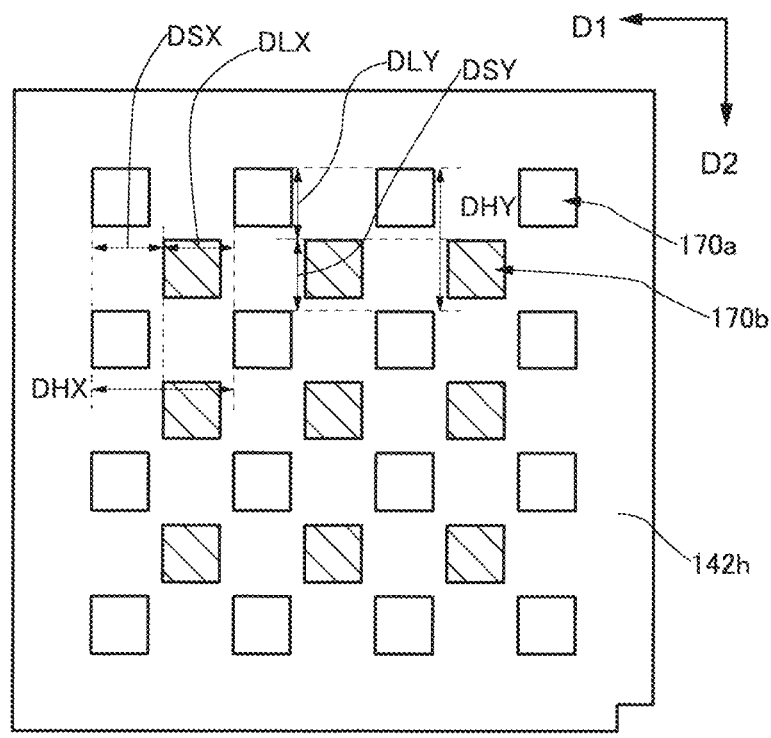
FIG. 12A is a plan view showing a modification of an opening of a pixel electrode.
Figure 12B:
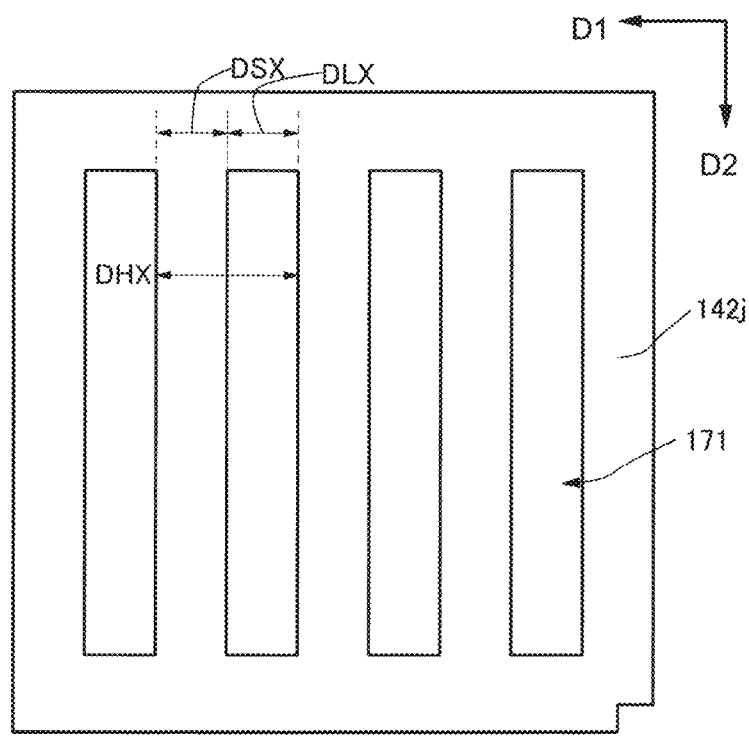
FIG. 12B is a plan view showing a modification of an opening of a pixel electrode.

A plurality of pixels PIX in the display region 102 is spaced apart from each other in a grid pattern (matrix pattern). Although details will be described later, each of the plurality of pixels PIX includes a pixel electrode 142a, and the pixel electrode 142a includes a plurality of openings 170, 170a, 170b, or 171 (FIG. 12A or FIG. 12B). The aperture ratio of each of the plurality of pixels PIX is the same. That is, the number of the openings in each of the plurality of pixels PIX is the same (uniform), and the (total) area of the openings in each of the plurality of pixels PIX is the same. In addition, the opening 170, the opening 170a, the openings 170b, and 171 (shown in FIG. 12A or FIG. 12B) formed in the pixel electrode 142a may be referred to as a first opening. In this case, the aperture ratio of the first opening formed in one pixel electrode 142a refers to the ratio of the opening 170 to the area of the entire pixel electrode 142a. For example, the aperture ratio is calculated by the following formula.

Aperture ratio=(area of opening 170/area of pixel electrode without opening 170)×100.

A row is a pixel row including m pixels PIX arranged in one direction, and a column is a pixel column including n pixels PIX arranged in a direction perpendicular to the direction in which the rows are arranged, in the display panel 100. The numerical values m and n are integers and are determined according to the display resolutions in the vertical direction and the horizontal direction. In addition, a plurality of scanning lines is arranged in each row, and a plurality of signal lines is arranged in each column. Each pixel is electrically connected to one scanning line 120a and one signal line 126a. For example, the pixel PIX shown in FIG. 1 is electrically connected to the scanning line 120a and the signal line 126a.

A drive circuit 105, a drive circuit 106, a terminal part 109, a terminal part 113, a plurality of connecting parts 244, a common wiring 245, and a capacitance wiring 246 are arranged in the peripheral region 104. The first substrate 103 and a second substrate 190 are arranged in both the peripheral region 104 and the display region 102. The drive circuit 105 is arranged on the left and right sides of the display region 102 parallel to the direction D1.

The drive circuit 105 functions as a gate driver. The drive circuit 106 has a function as a source driver. The pixel PIX functions as a component for displaying images. Specifically, the pixel PIX includes a liquid crystal element 135 (see FIG. 4). The liquid crystal element 135 has a function for transmitting or scattering light. A plurality of scanning lines including the scanning line 120a is connected to the drive circuit 105. A plurality of signal lines including the signal line 126a is connected to the drive circuit 106.

The common wiring 245 is arranged on a second surface 103B side of the first substrate 103 so as to surround the peripheral region 104. The connecting part 244 is arranged at four locations of the first substrate 103. The common wiring 245 of the first substrate 103 is electrically connected to a common electrode layer 150 (a common electrode 150a, see FIG. 4) arranged in the second substrate 190 using the connecting part 244. The capacitance wiring 246 is arranged on the second surface 103B side of the first substrate 103 so as to surround the display region 102 between the display region 102 and the drive circuit 105.

[1-1-2. Configuration of Control Device 200 and Lighting Equipment 300]

As shown in FIG. 1, the control device 200 includes a display panel controller 400 and a lighting controller 500.

The display panel controller 400 is connected to the display panel 100 at the terminal part 109 via the flexible printed circuit board 108. The display panel controller 400 supplies a signal to the drive circuit 105, the drive circuit 106, the capacitance wiring 246, and the common wiring 245. The drive circuit 105, the drive circuit 106, the capacitance wiring 246, and the common wiring 245 are controlled by the display panel controller 400.

The lighting controller 500 is connected to the lighting equipment 300 at the terminal part 113 via the flexible printed circuit board 111. The lighting controller 500 supplies a signal to the lighting equipment 300 and controls the lighting equipment 300.

The lighting equipment 300 includes a plurality of light-emitting elements (not shown). For example, the light-emitting element is a light-emitting diode (LED). The light-emitting element is not limited to the LED, and may be any light-emitting element capable of controlling the emission timing. The light-emitting element causes light to enter the substrate 192 or the second substrate 190, and the incident light irradiates the display panel 100. The light-emitting element may be one that causes light to enter an opposing glass.

[1-1-3. Cross-Sectional Structure of Display Device 10]

As shown in FIG. 2, the lighting equipment 300 faces a first side 192S1 of the substrate 192. A second side 192S2 of the substrate 192 is arranged parallel to a second side 190S2 of the second side 190. The lighting equipment 300 irradiates the first side 192S1 of the substrate 192 with light L1. The substrate 192 may guide the irradiated light L1. The irradiated light L1 enters the display panel 100 from the first side 192S1. The first side 192S1 becomes a light-incidence surface. For example, the substrate 192 may be referred to as a light guide plate. In addition, the lighting equipment 300 may be arranged to face a second side 190S1 of the second substrate 190.

Figure 4:
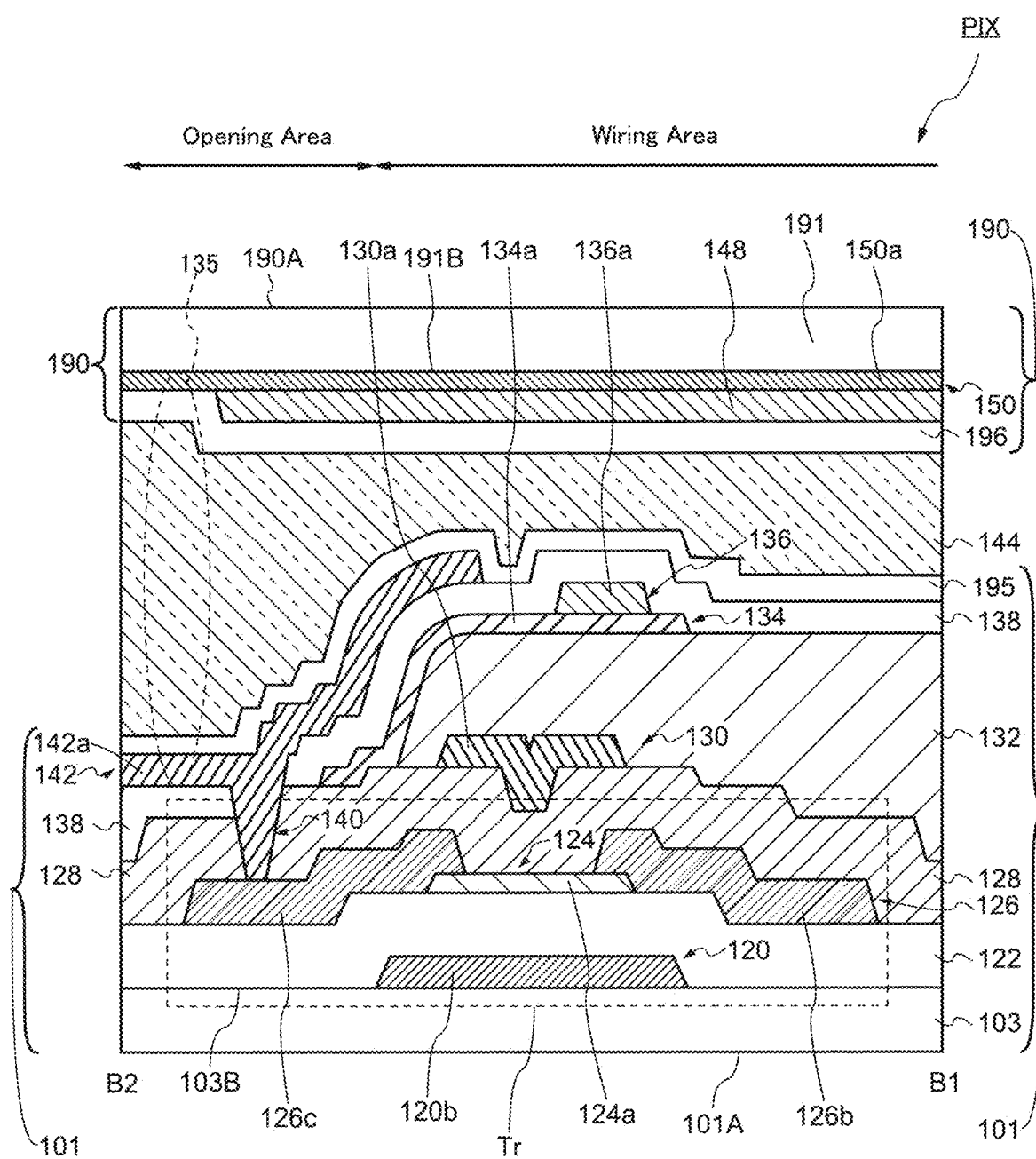
FIG. 4 is a cross-sectional view showing a cross-sectional structure of a pixel along a line B1-B2 of FIG. 1.

A substrate 101 includes the first substrate 103 (see FIG. 4). The second substrate 190 includes a second substrate 191 (see FIG. 4). The substrate 101, the second substrate 190, and the substrate 192 include materials having light transmittance. For example, the first substrate 103, the second substrate 191, and the substrate 192 include a glass substrate. In addition, the first substrate 103, the second substrate 191, and the substrate 192 may include a quartz substrate, may include an organic resin substrate, and may be a plastic substrate.

For example, the light L1 emitted from the lighting equipment 300 is reflected by a first surface 101A of the substrate 101 and a first surface 192A of the substrate 192, and propagates in a direction away from the first side 192S1 (the second direction D2). The light L1 propagated inside the substrate 101 and the substrate 192 enters a liquid crystal layer 144 (see FIG. 4) from the second substrate 190. For example, the light L1 propagated inside the substrate 101 and the substrate 192 is scattered by the pixel PIX where a voltage is applied and having the scattered liquid crystal layer 144 in a scattering state. The scattered light is light L2. In this case, an incident angle of the scattered light is smaller than the critical angle. Each light L2 is emitted to the outside from the first surface 192A of the substrate 192 and the first surface 101A of the substrate 101. When the display panel 100 is in the scattering state, most light L3 and light L4 respectively emitted to the outside from the first surface 192A of the substrate 192 and the first surface 101A of the substrate 101 are scattered light, and the scattered light is observed by an observer. For example, the light L1 propagating inside the substrate 101 and the substrate 192 is transmitted without being scattered by a certain pixel PIX where no voltage is applied and having the liquid crystal layer 144 in a transparent state. When the display panel 100 is in the transparent state, most of the light L3 and the light L4 emitted from the first surface 192A of the substrate 192 and the first surface 101A of the substrate 101 to the outside is transmitted light, and transmitted light is observed by the observer. Further, the liquid crystal element 135 includes the liquid crystal layer 144.

The substrate 101 includes a transistor, a capacitive element, a resistance element, an insulating layer, and a wiring layer. The substrate 101 is arranged to face the second substrate 190 and is bonded to the second substrate 190 using a sticker 194. The liquid crystal element 135 (the liquid crystal layer 144) is arranged between a second surface 101B of the substrate 101 and a second surface 190B of the second substrate 190. A second surface 192B of the substrate 192 is arranged above a first surface 190A of the second substrate 190. In the display device 10, the substrate 101 may be referred to as an array substrate, the first substrate 103 may be referred to as an array glass, the second substrate 190 may be referred to as a counter substrate, and the second substrate 191 may be referred to as a counter glass.

[1-1-4. Configuration of Pixel PIX]

Figure 3:
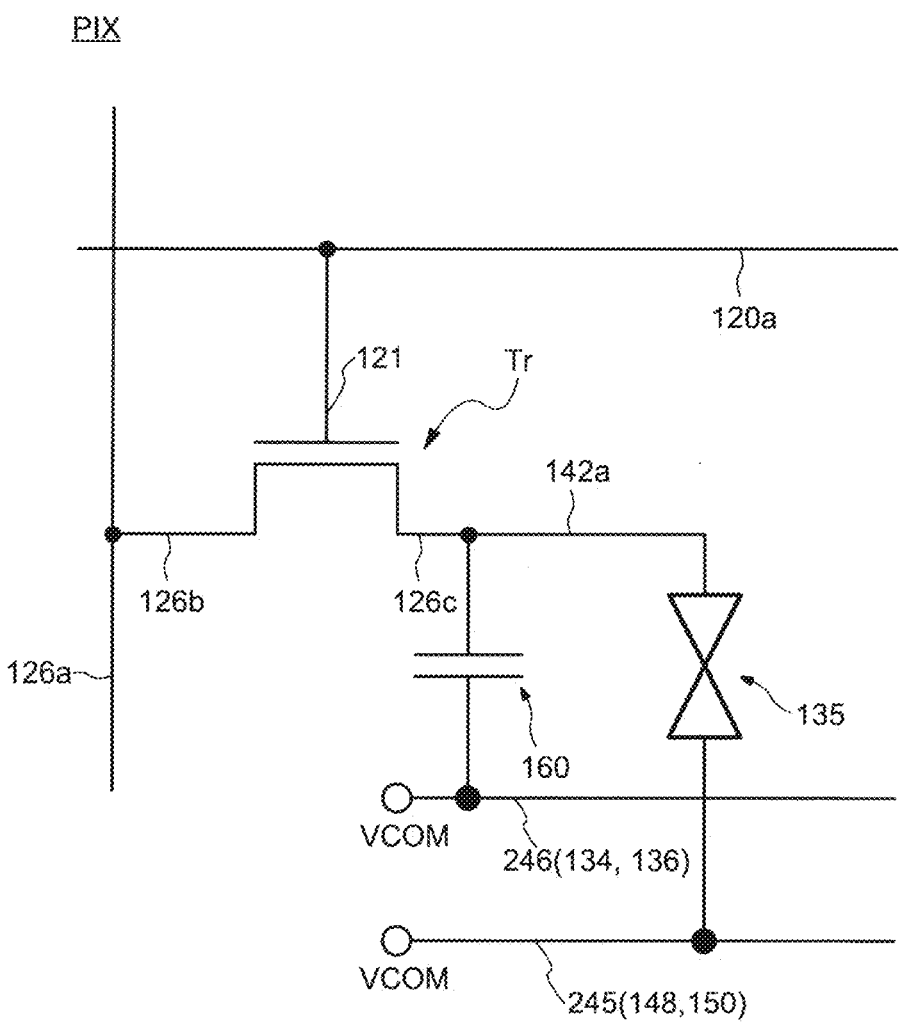
FIG. 3 is a circuit diagram showing a circuit configuration of a pixel according to the first embodiment of the present invention.

FIG. 3 is a circuit diagram showing a circuit configuration of the pixel PIX. FIG. 4 is a cross-sectional view showing a cross-sectional structure of the pixel PIX along a line B1-B2 shown in FIG. 1. Descriptions of the same or similar configurations as those in FIG. 1 and FIG. 2 may be omitted.

As shown in FIG. 3, for example, the pixel PIX includes a transistor Tr, the liquid crystal element 135, and a capacitive element 160. The transistor Tr includes a gate electrode 121, a source electrode 126b, and a drain electrode 126c. The gate electrode 121 is electrically connected to the scanning line 120a. The source electrode 126b is electrically connected to the signal line 126a. The drain electrode 126c is electrically connected to the pixel electrode 142a. The capacitive element 160 is electrically connected between the pixel electrode 142a (the drain electrode 126c) and the capacitance wiring 246. The liquid crystal element 135 is electrically connected between the pixel electrode 142a (the drain electrode 126c) and the common wiring 245. For example, a common voltage VCOM is supplied to the capacitance wiring 246 and the common wiring 245.

As shown in FIG. 4, the first substrate 103 includes the first surface 101A and the second surface 103B. A first conductive layer 120, an insulating layer 122, a semiconductor layer 124, and a second conductive layer 126 are arranged on the second surface 103B of the first substrate 103 in this order.

The first conductive layer 120 includes the scanning line 120a (see FIG. 1) and a first conductive film 120b. The semiconductor layer 124 includes a semiconductor film 124a. The second conductive layer 126 includes the source electrode 126b and the drain electrode 126c.

The transistor Tr is arranged on the second surface 103B. The transistor Tr includes the semiconductor film 124a arranged opposite to the first conductive film 120b, the insulating layer 122 arranged between the semiconductor film 124a, and the source electrode 126b and the drain electrode 126c arranged above the semiconductor film 124a.

The insulating layer 122 arranged between the semiconductor film 124a and the first conductive film 120b functions as a gate insulating film of the transistor Tr. The first conductive film 120b is electrically connected to the scanning line 120a and functions as the gate electrode 121. The source electrode 126b is electrically connected to the signal line 126a and functions as a source electrode. A region where the semiconductor film 124a overlaps the first conductive film 120b (gate electrode) is a channel region of the transistor Tr. The semiconductor film 124a may have a source region and a drain region so as to sandwich the channel region. The source region or drain region may form a source electrode or drain electrode.

An insulating layer 128 and a third conductive layer 130 are arranged above the transistor Tr in this order. The third conductive layer 130 includes a third conductive film 130a. The third conductive film 130a is arranged above the insulating layer 128 at a position facing the semiconductor film 124a. The third conductive film 130a functions as a back-gate electrode. In the display panel 100, the transistor Tr has a bottom-gate configuration as an example. The configuration of the transistor Tr is not limited to the bottom-gate configuration, and may be a top-gate configuration or a dual-gate configuration.

An insulating layer 132 is arranged above the third conductive layer 130 and the insulating layer 128. The display panel 100 in the display device 10 is a liquid crystal display panel using a polymer-dispersed liquid crystal. The number of layers that absorb light is preferably small in the liquid crystal display panel using the polymer-dispersed liquid crystal. Therefore, the insulating layer 132 is preferably removed in an opening region of the pixel PIX. As a result, it is possible to suppress light absorption by the insulating layer 132 in the opening region, in the display panel 100. Further, regions other than the opening region which include wirings such as the signal line 126a, the scanning line 120a, and the capacitance wiring 246 are referred to as a wiring region in the display panel 100.

A transparent conductive layer 134 and a fourth conductive layer 136 are arranged above the insulating layer 132 and the insulating layer 128 in this order. The transparent conductive layer 134 includes a transparent conductive film 134a, and the fourth conductive layer 136 includes a fourth conductive film 136a. The transparent conductive film 134a and the fourth conductive film 136a are electrically connected to the capacitance wiring 246 (see FIG. 3) in the display region 102 and the peripheral region 104. The fourth conductive film 136a is formed in contact with the transparent conductive film 134a.

An insulating layer 138 is arranged above the transparent conductive layer 134 and the fourth conductive layer 136. A pixel electrode layer 142 is arranged above the insulating layer 138. An alignment film 195 is arranged above the insulating layer 138 and the pixel electrode layer 142. The pixel electrode layer 142 includes the pixel electrode 142a. The pixel electrode 142a is electrically connected to the drain electrode 126c via an opening 140 penetrating the insulating layer 128 and the insulating layer 138.

The second substrate 191 includes the first surface 190A and a second surface 191B. The second substrate 191 is arranged to face the first substrate 103. Specifically, the second surface 191B of the second substrate 191 is arranged to face the second surface 103B of the first substrate 103. The common electrode layer 150 including the common electrode 150a and a black matrix 148 are arranged in the second surface 191B of the second substrate 191. The black matrix 148 is formed in contact with the common electrode layer 150. An alignment film 196 is arranged above the common electrode layer 150 and the black matrix 148. In the first embodiment, the common electrode layer 150 is arranged on the entire surface of the second surface 191B. The common electrode layer 150 is electrically connected to the common wiring 245 in the peripheral region 104. The black matrix 148 is arranged in a grid pattern in the display region 102 and the peripheral region 104. The liquid crystal layer 144 is sandwiched between the first substrate 103 and the second substrate 191 and sealed by the seal 194 (see FIG. 2). In the display panel 100, the liquid crystal element 135 includes the pixel electrode layer 142, the liquid crystal layer 144, and the common electrode layer 150. In addition, an arrangement of the common electrode layer 150 and the black matrix 148 is not limited to the configuration shown in FIG. 4, and may be a configuration in which the black matrix 148 is arranged on the second surface 191B of the second substrate 191, the common electrode layer 150 is arranged so as to cover the second surface 191B exposed from the black matrix 148 and an opening region of the black matrix 148, and the alignment film 196 is arranged on the common electrode layer 150.

For example, a metal such as aluminum (Al), titanium (Ti), molybdenum (Mo), copper (Cu), or tungsten (W), or an alloy thereof may be used as a material of the first conductive layer 120, the second conductive layer 126, the third conductive layer 130, and the fourth conductive layer 136. In addition, the first conductive layer 120, the second conductive layer 126, the third conductive layer 130, and the fourth conductive layer 136 may be single layers or stacked layers.

The insulating layer 122 may separate the semiconductor layer 124 from the first conductive layer 120 so that the semiconductor layer 124 and the first conductive layer 120 do not short-circuit. For example, an inorganic insulating material such as silicon oxide ($SiO_x$), silicon oxynitride ($SiO_xN_y$), silicon nitride ($SiN_x$), or silicon nitride oxide ($SiN_xO_y$) can be used as the material for forming the insulating layer 122. In this case, $SiO_xN_y$ is a silicon compound containing less nitrogen (N) than oxygen (O). $SiN_xO_y$ is a silicon compound containing less oxygen than nitrogen.

The insulating layer 132 is arranged above an unevenness caused by the transistor Tr or other semiconductor elements and has a function for forming a flat surface. An organic compound material selected from acrylic, polyimide, and the like, which has excellent film surface flatness, can be used as a material for forming an insulating layer 143.

The insulating layer 128 may separate the semiconductor layer 124 and the second conductive layer 126 from the third conductive layer 130 so that the semiconductor layer 124, the second conductive layer 126, and the third conductive layer 130 do not short-circuit. For example, a material similar to that of the insulating layer 122, an inorganic insulating material such as aluminum oxide ($AlO_x$), aluminum oxynitride ($AlO_xN_y$), aluminum nitride oxide ($AlN_xO_y$), or aluminum nitride ($AlN_x$) can be used as a material for forming the insulating layer 128.

In this case, $AlO_xN_y$ is an aluminum compound containing less nitrogen (N) than oxygen (O). $AlN_xO_y$ is an aluminum compound containing less oxygen than nitrogen. In the insulating layer 128, an inorganic insulating material may be used alone, or they may be stacked.

The insulating layer 138 may separate the transparent conductive layer 134 and the fourth conductive layer 136 from the pixel electrode layer 142 so that the transparent conductive layer 134, the fourth conductive layer 136, and the pixel electrode layer 142 do not short-circuit. The insulating layer 138 is formed using the same material as the insulating layer 128, and has the same configuration.

For example, a transparent conductive material such as indium-tin-oxide (ITO) or indium-zinc-oxide (IZO) can be used as a material for forming the transparent conductive layer 134, the pixel electrode layer 142, and the common electrode layer 150.

A black resin or a metal material can be used as a material for forming the black matrix 148. The metal material may be chromium, molybdenum, or titanium, which has a relatively low reflectance with respect to aluminum. When the black matrix 148 is formed using a metal material compared to the common electrode formed of the transparent conductive material, a resistance value of the black matrix 148 is smaller than a resistance value of the common electrode layer 150 formed of the transparent conductive material. In the display panel 100, the common electrode is formed with the black matrix 148 and the common electrode layer 150. As a result, in the common electrode of the display panel 100, the black matrix 148 functions as an auxiliary electrode with low resistance dissipation.

The substrate 101 described in "1-1-3. Cross-Sectional Structure of Display Device 10" includes the first substrate 103, the first conductive layer 120, the insulating layer 122, the semiconductor layer 124, the second conductive layer 126, the insulating layer 128, the third conductive layer 130, the insulating layer 132, the transparent conductive layer 134, the fourth conductive layer 136, the insulating layer 138, the pixel electrode layer 142, and the alignment film 195. The substrate 101 is an array substrate.

The second substrate 190 described in "21-1-3. Cross-Sectional Structure of Display Device 10" includes the second substrate 191, the common electrode layer 150, the black matrix 148, and the alignment film 196. The second substrate 190 is a counter substrate.

[1-1-5. Configuration of Pixel Electrode 142*a*]

Figure 5:
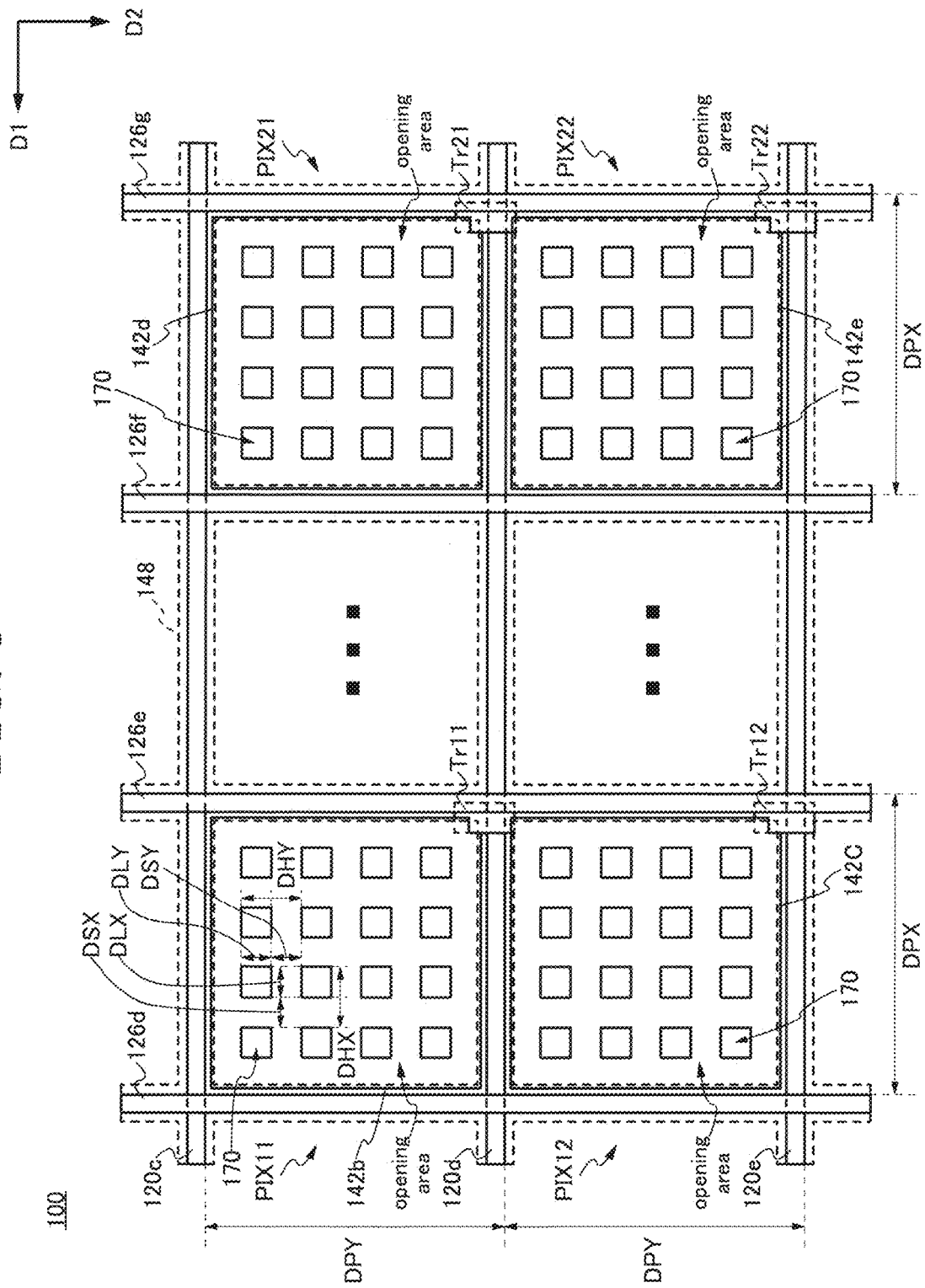
FIG. 5 is an enlarged plan view of part of a display region of FIG.
Figure 6:
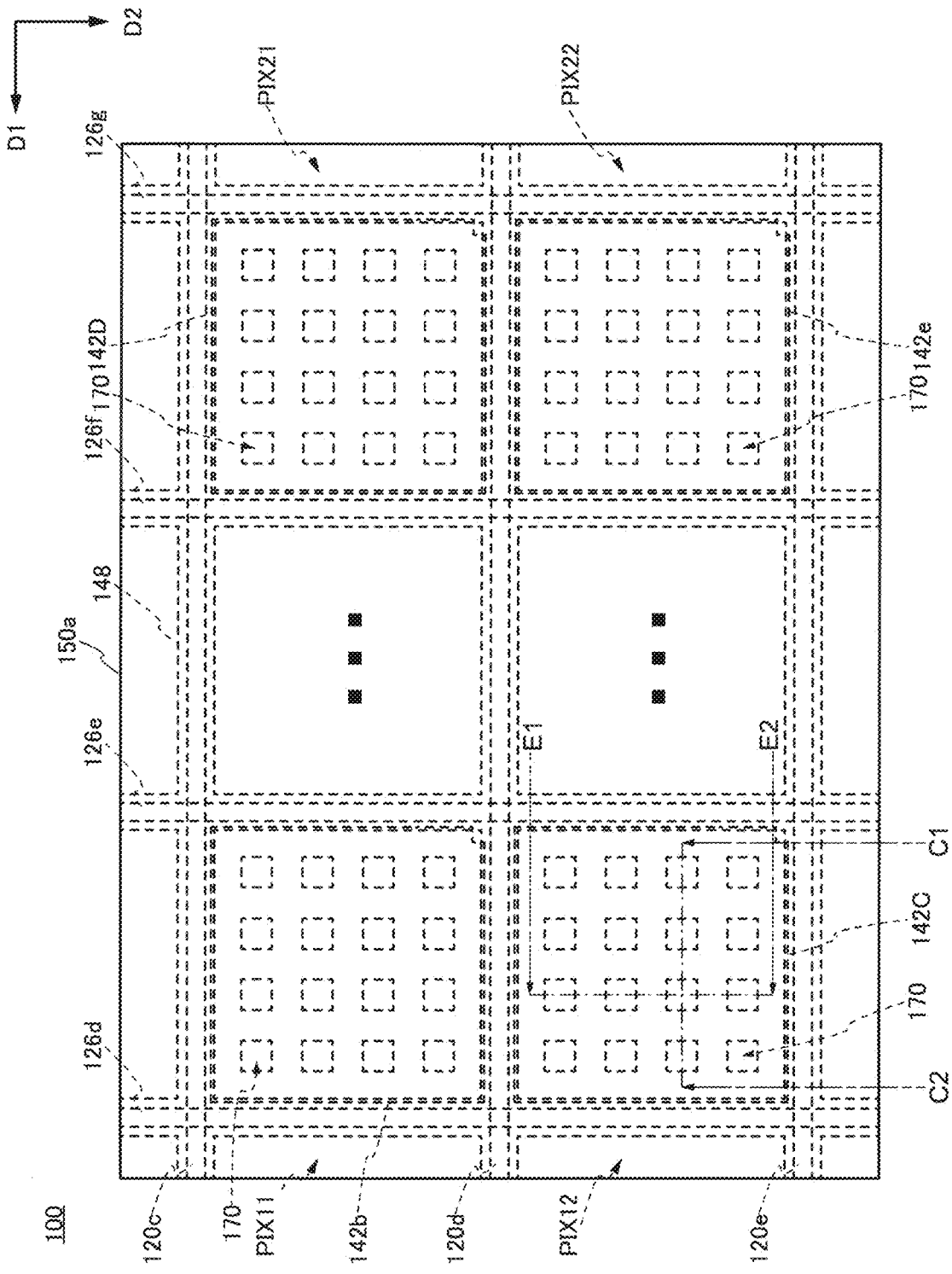
FIG. 6 is an enlarged plan view of part of a display region of FIG. 1.
Figure 7:
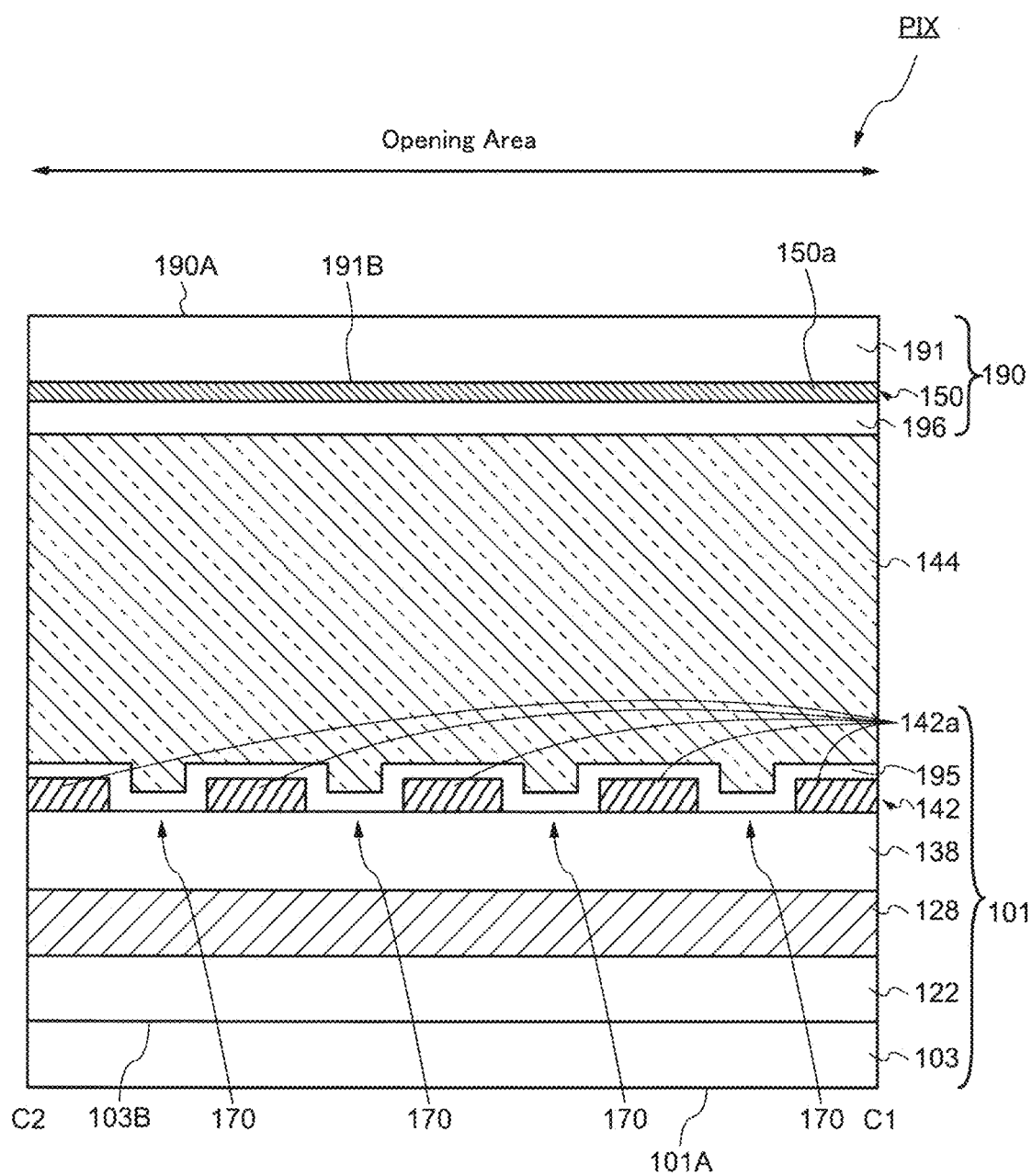
FIG. 7 is a cross-sectional view showing a cross-sectional structure of a display panel along a line C1-C2 of FIG. 6.

FIG. 5 and FIG. 6 are enlarged views of part of the display region 102. FIG. 7 is a cross-sectional view showing a cross-sectional structure of the display panel 100 along a line C1-C2 of FIG. 6. Descriptions of the same or similar configurations as those in FIG. 1 to FIG. 3 may be omitted.

In FIG. 5, the common electrode layer 150 and the like including the common electrode 150*a* of the second substrate 190 are omitted for the sake of clarity. In FIG. 6, the transistor Tr, a pitch of the opening 170, a pitch of the pixel PIX, and the like are omitted for the sake of clarity.

As shown in FIG. 5, each of scanning lines 120*c*, 120*d*, and 120*e* in the display panel 100 extends in a first direction DX. The scanning lines 120*c* and 120*d* and the scanning lines 120*d* and 120*e* are adjacent in the second direction D2.

Each of signal lines 126*d*, 126*e*, 126*f*, and 126*g* extends in the second direction D2. The signal lines 126*d*, 126*e*, 126*f*, and 126*g* intersect the scanning lines 120*c*, 120*d*, and 120*e*. The signal lines 126*d* and 126*e*, the signal lines 126*e* and 126*f*, and the signal lines 126*f* and 126*g* are adjacent in the first direction DX. A plurality of signal lines (and the pixel PIX) (not shown) is arranged between the signal line 126*e* and the signal line 126*f*.

The black matrix 148 is arranged so as to overlap the scanning lines 120*c*, 120*d*, and 120*e* and the signal lines 126*d*, 126*e*, 126*f*, and 126*g*. That is, reflection of light on the scanning lines 120*c*, 120*d*, and 120*e* and the signal lines 126*d*, 126*e*, 126*f*, and 126*g* can be suppressed.

A pixel PIX11 includes a transistor Tr11 and a pixel electrode 142*b*. The transistor Tr11 is electrically connected to the scanning line 120*d* and the signal line 126*e*, and the pixel electrode 142*b* is electrically connected to the transistor Tr11. The pixel electrode 142*b* includes the plurality of openings 170. A pixel PIX12 includes a transistor Tr12 and a pixel electrode 142*c*. The transistor Tr12 is electrically connected to the scanning line 120*e* and the signal line 126*e*, and the pixel electrode 142*c* is electrically connected to the transistor Tr12. The pixel electrode 142*c* includes the plurality of openings 170. The pixel PIX11 and the pixel PIX12 are arranged adjacent in the second direction D2.

A pixel PIX21 is arranged side by side with the pixel PIX11 in the first direction D1. A pixel PIX22 is arranged adjacent to the pixel PIX21 in the second direction D2, and is arranged side by side with the pixel PIX12 in the first direction D1. Since the pixel PIX21 and the pixel PIX22 have the same configuration and function as those of the pixel PIX11 and the pixel PIX12, descriptions will be omitted here.

An interval DPY between the scanning lines 120*c* and 120*d* in the second direction D2 is the same as an interval DPY between the scanning lines 120*d* and 120*e* in the second direction D2. An interval DPX between the signal lines 126*d* and 126*e* in the first direction DX is the same as an interval DPX between the signal lines 126*f* and 126*g* in the first direction DX. That is, in the display panel 100, a pitch of the pixel PIX in the first direction D1 is the interval DPX, and a pitch of the pixel PIX in the second direction D2 is the interval DPY. Therefore, the area of each pixel are the same.

Each of the pixel PIX in the display panel 100 includes the pixel electrode 142*a*. The plurality of openings 170 is arranged in the pixel electrode 142*a*. A pitch of the plurality of openings 170 in the first direction D1 is an interval DHX, and a pitch of the plurality of openings 170 in the second direction D2 is an interval DHY. A size of the opening 170 is a length DLX in the first direction D1 and a length DLY in the second direction D2. In addition, a distance between the opening 170 and the adjacent opening 170 in the first direction D1 is a distance DSX, and a distance between the opening 170 and the adjacent opening 170 in the second direction D2 is a distance DSY. For example, the interval DHY and the interval DHX are 6 μm, the length DLX and the length DLY are 3 μm, and the distance DSX and the distance DSY are 3 μm. In FIG. 5, the number of openings 170 of each pixel is 16 as an example. For example, the actual size of the pixel PIX is 360 μm in the interval DPX and the interval DPY, and a size of the opening 170 is 3 μm in the length DLX and the length DLY, and 6 μm in the interval DHY and the interval DHX. Therefore, the number of the openings 170 is, for example, 3600.

In FIG. 6, the common electrode layer 150 including the common electrode 150*a* is indicated by a solid line, and the scanning lines 120*c*, 120*d*, and 120*e*, the signal lines 126*d*, 126*e*, 126*f*, and 126*g*, the pixel electrodes 142*b*, 142*c*, 142*d*, and 142*e*, the plurality of openings 170, and the black matrix 148, which are arranged below the common electrode layer 150, are indicated by broken lines. Since the configuration is the same as that of FIG. 5 except that the common electrode layer 150 including the common electrode 150*a* is arranged on the entire surface of the display panel 100, descriptions will be omitted here.

As shown in FIG. 7, the pixel electrode layer 142 includes the pixel electrode 142*a* and the plurality of openings 170. The pixel electrode 142*a* is arranged on a flat surface of the insulating layer 138 from which the insulating layer 132 has been removed. Since a cross-sectional structure of the display panel 100 along a line E1-E2 of FIG. 6 is similar to that of FIG. 7, descriptions will be omitted here.

As described above, each of the plurality of pixels PIX in the display panel 100 includes the pixel electrode 142*a* in which the plurality of openings 170 is arranged. The plurality of openings 170 is arranged in a region defined as the pixel electrode 142*a*. In the region defined as the pixel electrode 142*a*, the ratio occupied by the plurality of openings 170 is constant in each of the plurality of pixels PIX. With such a configuration, the entire display region 102 can have uniform transparency. In addition, arranging the plurality of openings 170 in the region defined as the pixel electrode 142*a* at a constant rate makes it possible to reduce light absorption loss due to the pixel electrode 142*a*.

Specifically, in the case where the pixel electrode 142*a* is formed of a transparent conductive material, the plurality of openings 170 is arranged as a region from which the transparent conductive material has been removed. In the case where the plurality of openings 170 is arranged in this manner, the rate at which the light transmitted through the region defined as the pixel electrode 142*a* is absorbed by the transparent conductive material can be reduced. As a result, the transparency of the display region 102 can be increased. In addition, when light is scattered at the pixel PIX, absorption loss of the scattered light due to the transparent conductive material can be reduced. That is, the scattered light intensity (brightness) of the light L3 and the light L4 described with reference to FIG. 2 can be increased.

[1-1-6. Relationship Between the Size of Opening of Pixel Electrode Layer 142 and Liquid Crystal Capacitance]

Figure 8:
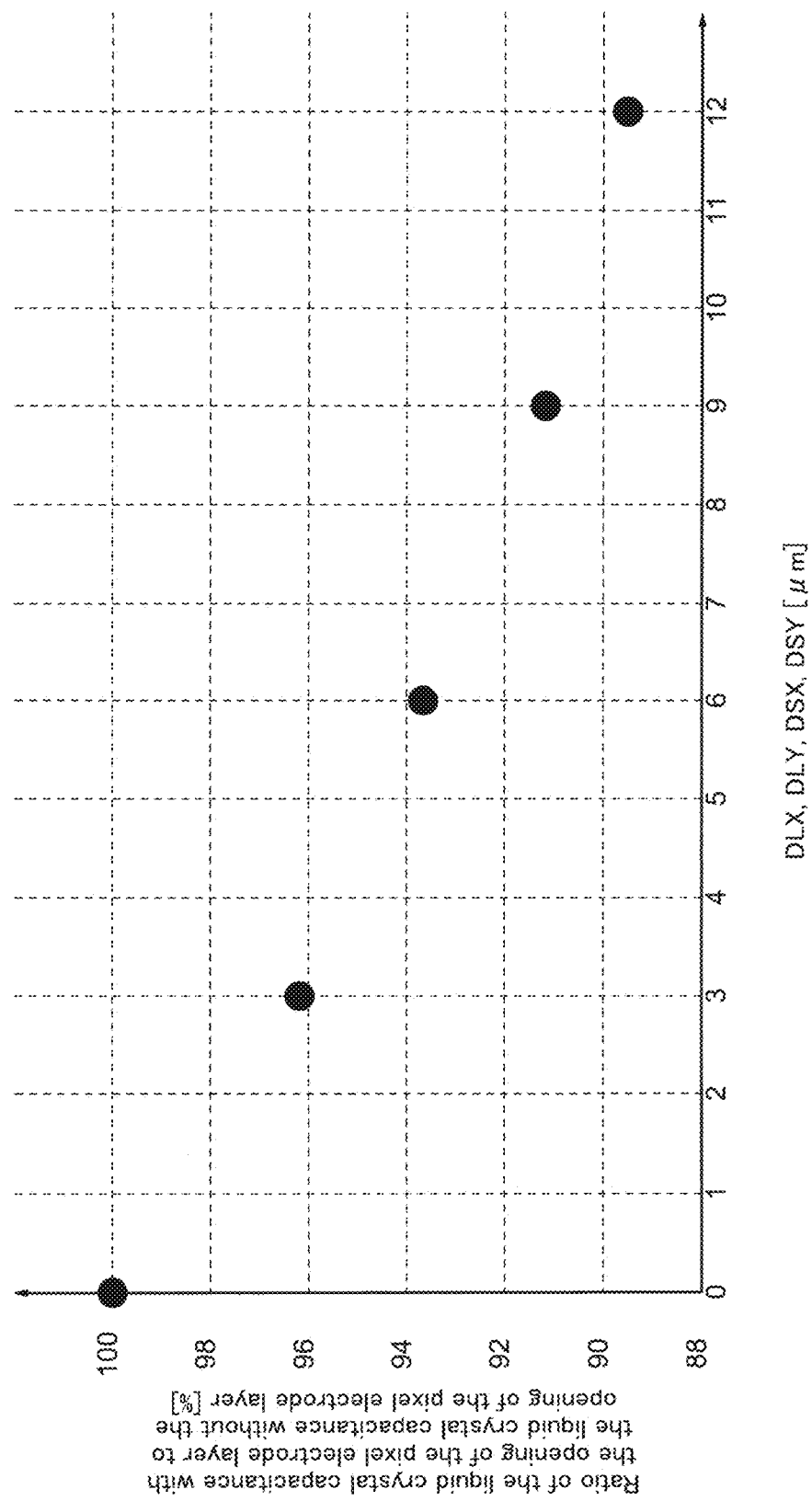
FIG. 8 is a graph showing a relationship between a size of an opening of a pixel electrode layer and a liquid crystal capacitance.

FIG. 8 is a graph showing a relationship between the size of the opening 170 of the pixel electrode layer 142 and a liquid crystal capacitance. Descriptions of the same or similar configurations as those in FIG. 1 to FIG. 8 may be omitted.

The horizontal axis of FIG. 8 is the length DLX of the opening 170 of the pixel electrode layer 142 in the first direction D1, the length DLY in the second direction D2, the distance DSX between the opening 170 and the adjacent opening 170 in the first direction D1, or the distance DSY between the opening 170 and the adjacent opening 170 in the second direction D2. The vertical axis of FIG. 8 is the ratio of the liquid crystal capacitance of the pixel PIX (one pixel, the pixel electrode 142a) in the case where the pixel electrode layer 142 does not include the opening 170 (that is, 0 μm on the horizontal axis) to the liquid crystal capacitance of the pixel PIX (one pixel, the pixel electrode 142a) in the case where the pixel electrode layer 142 includes the opening 170 of the size shown on the horizontal axis (hereinafter, simply referred to as the ratio).

The length DLX, the length DLY, the distance DSX, and the distance DSY are design values, and as for the ratio, the length DLX, the length DLY, the distance DSX, and the distance DSY are calculated values calculated with respect to the design values. Further, the size of the pixel PIX is fixed and the total area of the opening 170 is the same, in each plot in the graph. That is, the number of each of the openings of the plurality of pixels PIX is the same (uniform), and the (total) area of each of the openings of the plurality of pixels PIX is the same. In addition, the area of the opening 170 can be made equal by adjusting the number of openings 170 in the case where the size of the opening 170 is different, so that the area of the pixel electrode 142a is equivalent. For example, when the size of the opening 170 is small, the number of openings 170 is large, the area of the pixel electrode 142a is small, and when the size of opening 170 is large, the number of openings 170 is small, and the area of the pixel electrode 142a is large.

As shown in FIG. 8, the ratio is 100% when the opening 170 is 0 μm. The ratio is approximately 96.0% when the length DLX, the length DLY, the distance DSX, or the distance DSY are 3 μm, the ratio is approximately 93.5% when the length DLX, the length DLY, the distance DSX, or the distance DSY are 6 μm, the ratio is approximately 91.0% when the length DLX, the length DLY, the distance DSX, or the distance DSY are 9 μm, and the ratio is approximately 89.0% when the length DLX, the length DLY, the distance DSX, or the distance DSY are 12 μm.

That is, under a condition that the size of the pixel PIX is fixed and the total area of the opening 170 is the same, it is considered that the smaller the size of the opening 170, the more a fringe electric field is applied to the liquid crystal layer 144. As a result, the reduction in brightness due to the fact that no electric field is applied to the liquid crystal layer 144 is suppressed as the opening 170 is smaller. Therefore, the transmittance does not change even when the size of the opening 170 is different.

For example, the size of the opening 170 is preferably designed to be 12 μm or less in applications where the ratio of approximately 90% is acceptable.

For example, the electric field applied to the liquid crystal layer 144 generated between the pixel electrode 142a and the common electrode 150a is weakened in the case where the ratio is small (the case where the liquid crystal capacitance decreases), so that the brightness may decrease. However, in this case, since the liquid crystal capacitance decreases and the loads at the time of driving the pixel PIX decrease, the writing of an image signal (image data) to the pixel PIX becomes faster. Therefore, the lighting controller 500 can be used to prolong the period of time for lighting the light-emitting element included in the lighting equipment 300, or the light-emitting element with emission intensity can be used to compensate for the decrease in brightness, in the display device 10.

[1-1-7. First Modification of Opening]

Figure 9:
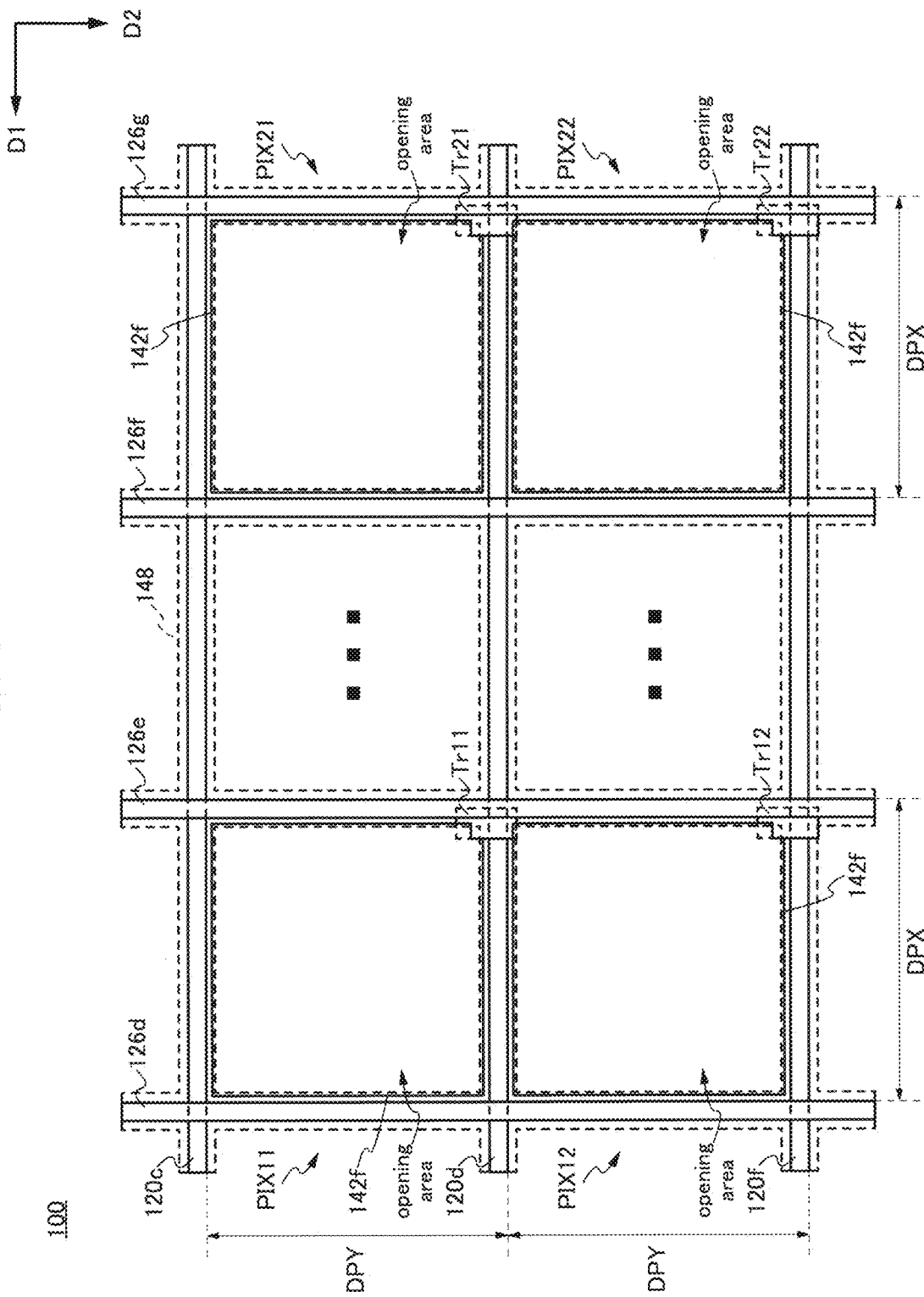
FIG. 9 is an enlarged plan view of part of a display region of FIG.
Figure 10:
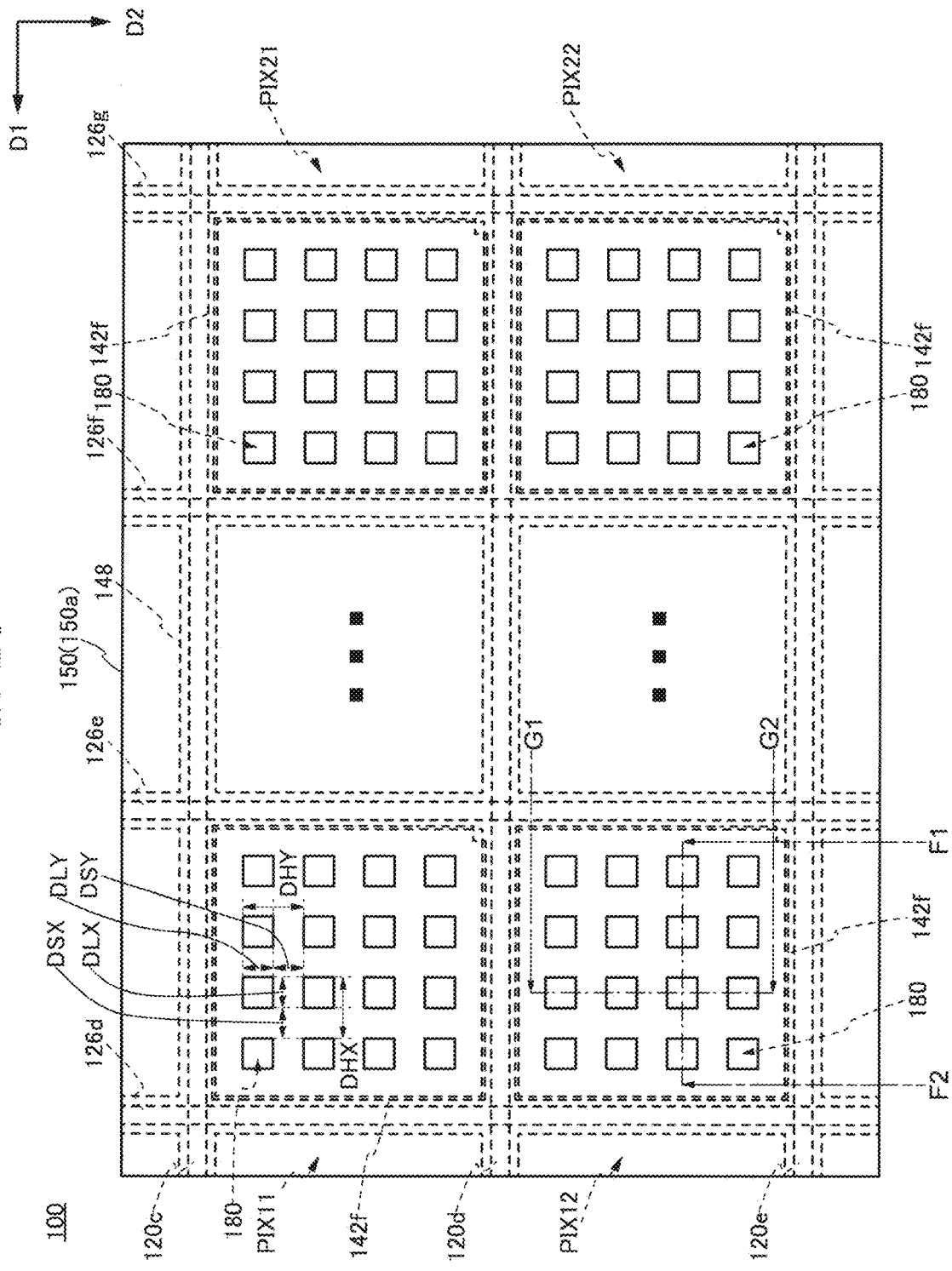
FIG. 10 is an enlarged plan view of part of a display region of FIG. 1.
Figure 11:
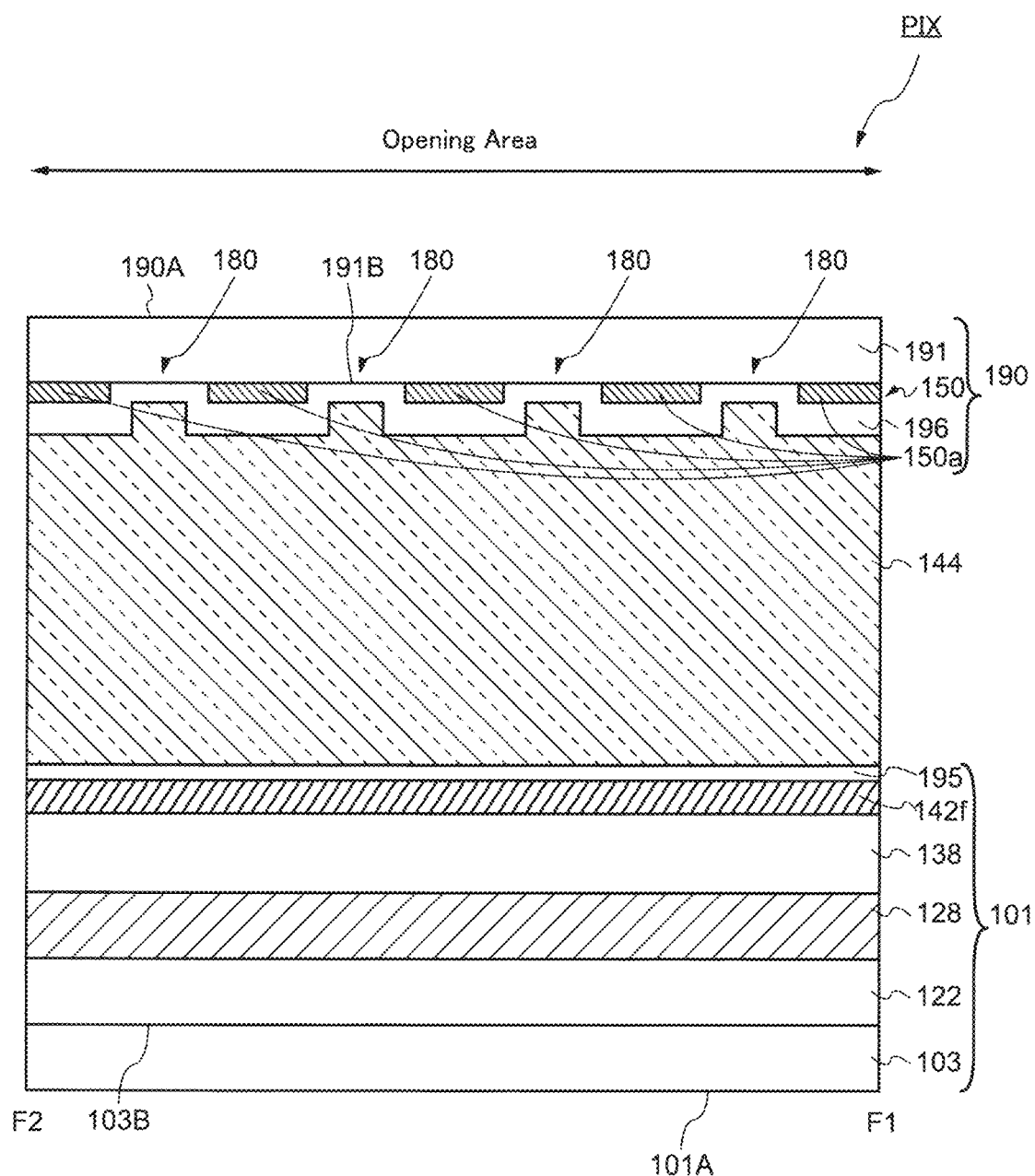
FIG. 11 is a cross-sectional view showing a cross-sectional structure of a display panel along a line F1-F2 of FIG. 10.

An example in which the common electrode layer 150 includes the common electrode 150a and an opening 180 will be described in a first modification of the opening. FIG. 9 and FIG. 10 are enlarged views of part of the display region 102. FIG. 11 is a cross-sectional view showing a cross-sectional structure of the display panel 100 along a line F1-F2 of FIG. 10. Descriptions of the same or similar configurations as those in FIG. 1 to FIG. 8 may be omitted.

In FIG. 9, the common electrode layer 150 and the like of the second substrate 190 are omitted for the sake of clarity.

FIG. 9 to FIG. 4 are different from FIG. 5 to FIG. 8 in that the pixel electrode layer 142 does not include the opening 170 and includes a pixel electrode 142f, and the common electrode layer 150 arranged in the second substrate 190 includes the opening 180 and the common electrode 150a similar to the plurality of openings 170. In FIG. 9 to FIG. 14, since the other points are the same as those in FIG. 5 to FIG. 8, differences from those in FIG. 5 to FIG. 8 will be described in FIG. 9 to FIG. 14.

As shown in FIG. 9, each of the pixel PIX11, the pixel PIX12, the pixel PIX21, and the pixel PIX22 includes the pixel electrode 142f. The pixel electrode layer 142 does not include the opening 170, and the opening 170 is not arranged in the pixel electrode 142f.

As shown in FIG. 10, the common electrode layer 150 includes a plurality of openings 180 having the same configuration and function as the plurality of openings 170. The plurality of openings 180 in the common electrode layer 150 is arranged at the same position as the plurality of openings 170 depending on the pixel electrode 142f of each pixel PIX. Therefore, a pitch in the first direction D1 is the interval DHX, and a pitch in the second direction D2 is the interval DHY in the plurality of openings 180. A size of the opening 180 is the length DLX in the first direction D1 and the length DLY in the second direction D2. In addition, a distance between the opening 180 and the adjacent opening 180 in the first direction D1 is the distance DSX, and a distance between the opening 180 and the adjacent opening 180 in the second direction D2 is the distance DSY.

In FIG. 10, the common electrode 150a and the plurality of openings 180 arranged in the common electrode layer 150 are indicated by solid lines, and the scanning lines 120c, 120d, and 120e, the signal lines 126d, 126e, 126f, and 126g, the pixel electrode 142f, and the black matrix 148 arranged below the common electrode layer 150 are indicated by broken lines.

As shown in FIG. 11, the pixel electrode 142f is arranged on a flat surface of the insulating layer 138 from which the insulating layer 132 has been removed. The opening 180 and the common electrode 150a are arranged in the common electrode layer 150. The opening portion 180 penetrates to the second surface 191B, and the alignment film 196 is arranged in the penetrated portion. In addition, since a cross-sectional configuration of the display panel 100 along a line G1-G2 of FIG. 10 is similar to that of FIG. 11, descriptions will be omitted here.

As described above, each of the plurality of pixels PIX in the display panel 100 includes the common electrode 150a in which the plurality of openings 180 is arranged. That is, the plurality of openings 180 is arranged in the region defined as the pixel PIX. The ratio occupied by the plurality of openings 180 is constant in each of the plurality of pixels PIX. Therefore, as in the configuration described in "1-1-5. Configuration of Pixel Electrode 142a", the entire display region 102 can have uniform transparency. Further, arranging the plurality of openings 180 in the region defined as the pixel PIX at a constant rate makes it possible to reduce the light absorption loss due to the common electrode 150a.

Specifically, in the case where the common electrode layer 150 is formed of a transparent conductive material, the plurality of openings 180 is arranged as a region from which the transparent conductive material has been removed. The rate at which the light transmitted through the region defined as the common electrode 150a is absorbed by the transparent conductive material can be reduced, in the case where the plurality of openings 180 is arranged in this manner. As a result, the transparency of the display region 102 can be increased. In addition, when light is scattered at the pixel PIX, absorption loss of the scattered light due to the transparent conductive material can be reduced. That is, the scattered light intensity (brightness) of the light L3 and the light L4 described with reference to FIG. 2 can be increased.

Further, the rate at which the light propagating in the display device 10 (for example, including the light L1) is absorbed by the common electrode 150a can be reduced, in the case where the plurality of openings 180 is arranged as the region from which the transparent conductive material has been removed. As a result, the amount of light propagating in the display device 10 increases, and the brightness in the scattering state can be increased. Therefore, the brightness associated with the light L3 and the light L4 in the scattering state can be increased, which is described with reference to FIG. 2.

[1-1-8. Second Modification of Opening]

In a second modification of the opening, a modification of the opening of the pixel electrode 142a will be described. FIG. 12A and FIG. 12B are diagrams showing a modification of an opening in the pixel electrode 142a. Descriptions of the same or similar configurations as those in FIG. 1 to FIG. 11 may be omitted.

The pixel electrode layer 142 include a pixel electrode 142h and the plurality of openings 170. The pixel electrode 142h shown in FIG. 12A is different from the arrangement of the opening 170 in the pixel electrode 142a of FIG. 5 in that sizes of the interval DHX, the interval DHY, the length DLX, the length DLY, the distance DSX, and the distance DSY are the same and the opening 170 is arranged in a checkered pattern. Specifically, the arrangement of the checkered pattern is an arrangement in which the opening 170a having an arrangement similar to that of the opening 170 in the pixel electrode 142a of FIG. 5 is combined with the opening 170b having an arrangement in which the opening 170a is shifted in the direction D1 and the direction D2 by the distance DSX and the distance DSY.

The pixel electrode layer 142 includes a pixel electrode 142j and the plurality of openings 170. The pixel electrode 142j shown in FIG. 12B is different from the arrangement of the opening 170 in the pixel electrode 142a of FIG. 5 in that the interval DHX, the length DLX, and the distance DSX are the same and the opening 171 is slit-shaped. The plurality of openings 171 extends in the second direction D2 and is aligned in the first direction D1.

In addition, the plurality of openings 171 may extend in the first direction D1 and be arranged in the second direction D2. That is, the plurality of openings 171 may be rotated by 90 degrees with respect to the configuration shown in FIG. 12B.

The ratio occupied by the plurality of openings 171 in a region defined as the pixel electrode 142h or the pixel electrode 142j is greater than the ratio occupied by the plurality of openings 170 in the region defined as the pixel electrode 142a. Therefore, the rate at which the light transmitted through the region, which is defined as the pixel electrode 142h and the pixel electrode 142j, is absorbed by the transparent conductive material is reduced more than the rate at which the light transmitted through the region, which is defined as the pixel electrode 142a, is absorbed by the transparent conductive material. As a result, the transparency of the display region 102 in a display panel including the pixel electrode 142h or the pixel electrode 142j can be further increased more than that of in the display panel including the pixel electrode 142a. In addition, when light is scattered at the pixel PIX, absorption loss of the scattered light due to the transparent conductive material can be further reduced.

In addition, the same configuration and function as in the second modification of the opening can be applied to the common electrode layer 150.

2. Second Embodiment

Figure 13A:
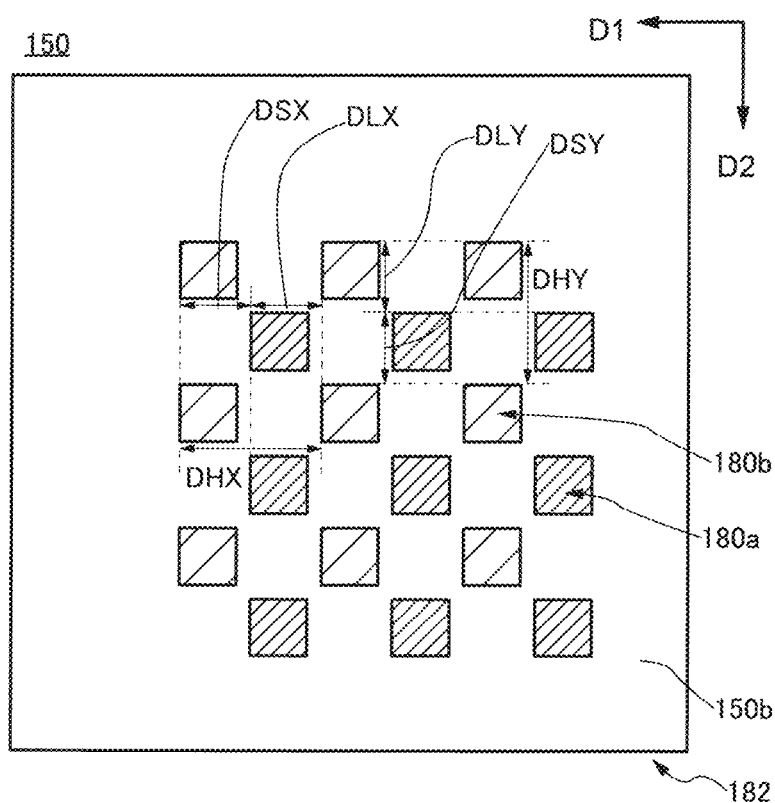
FIG. 13A is an enlarged plan view of a common electrode corresponding to one pixel in a display region of a display device according to a second embodiment.
Figure 13B:
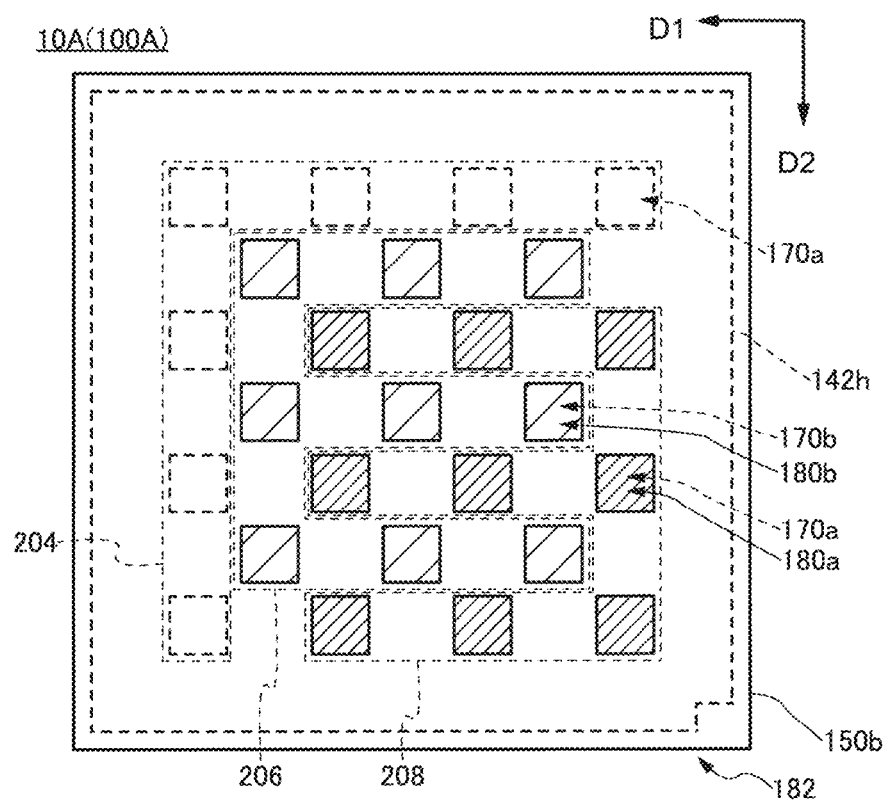
FIG. 13B is an enlarged plan view of a vicinity of one pixel PIX in a display region of a display device.
Figure 14:
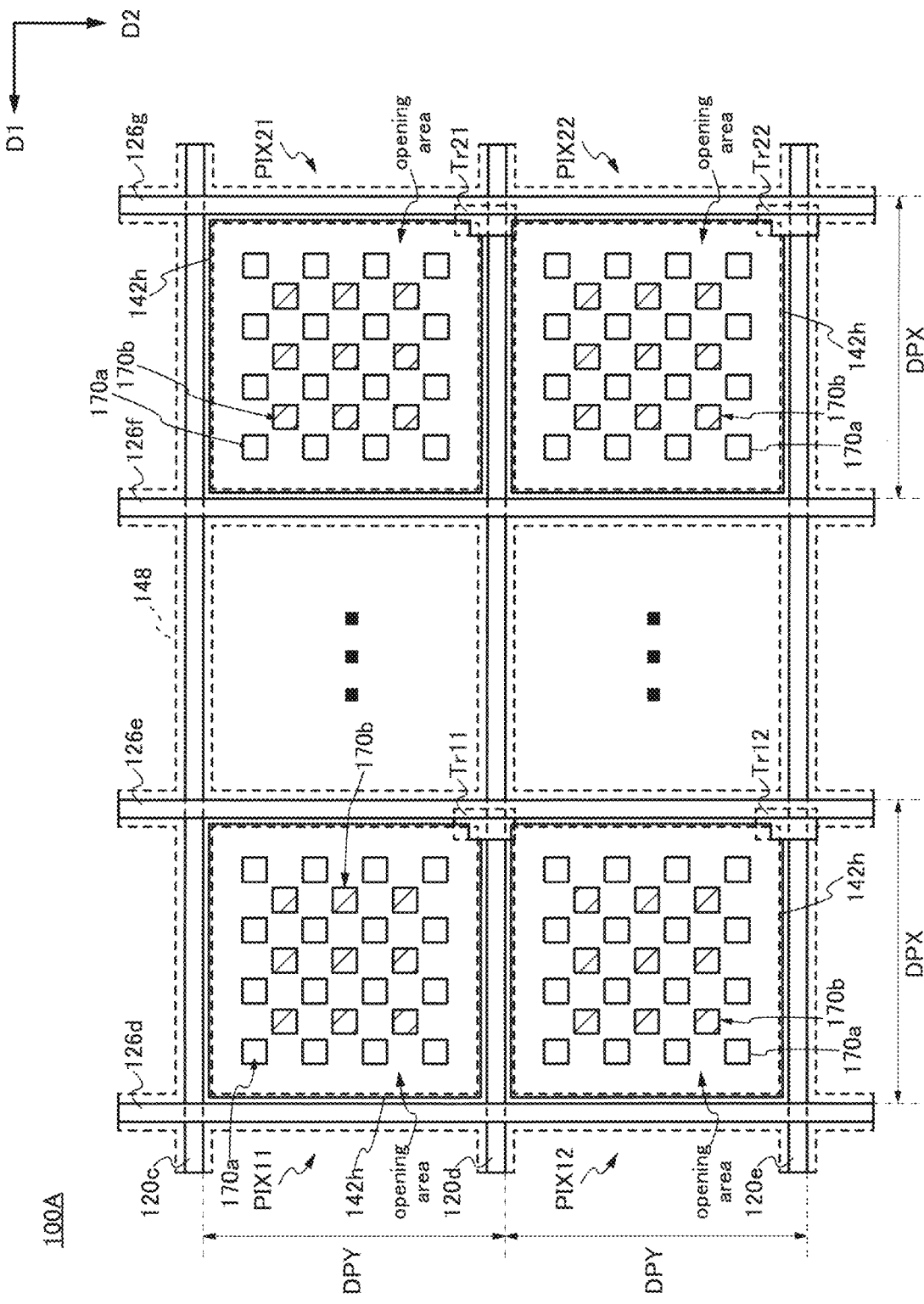
FIG. 14 is an enlarged plan view of part of a display region of a display device according to the second embodiment.
Figure 15:
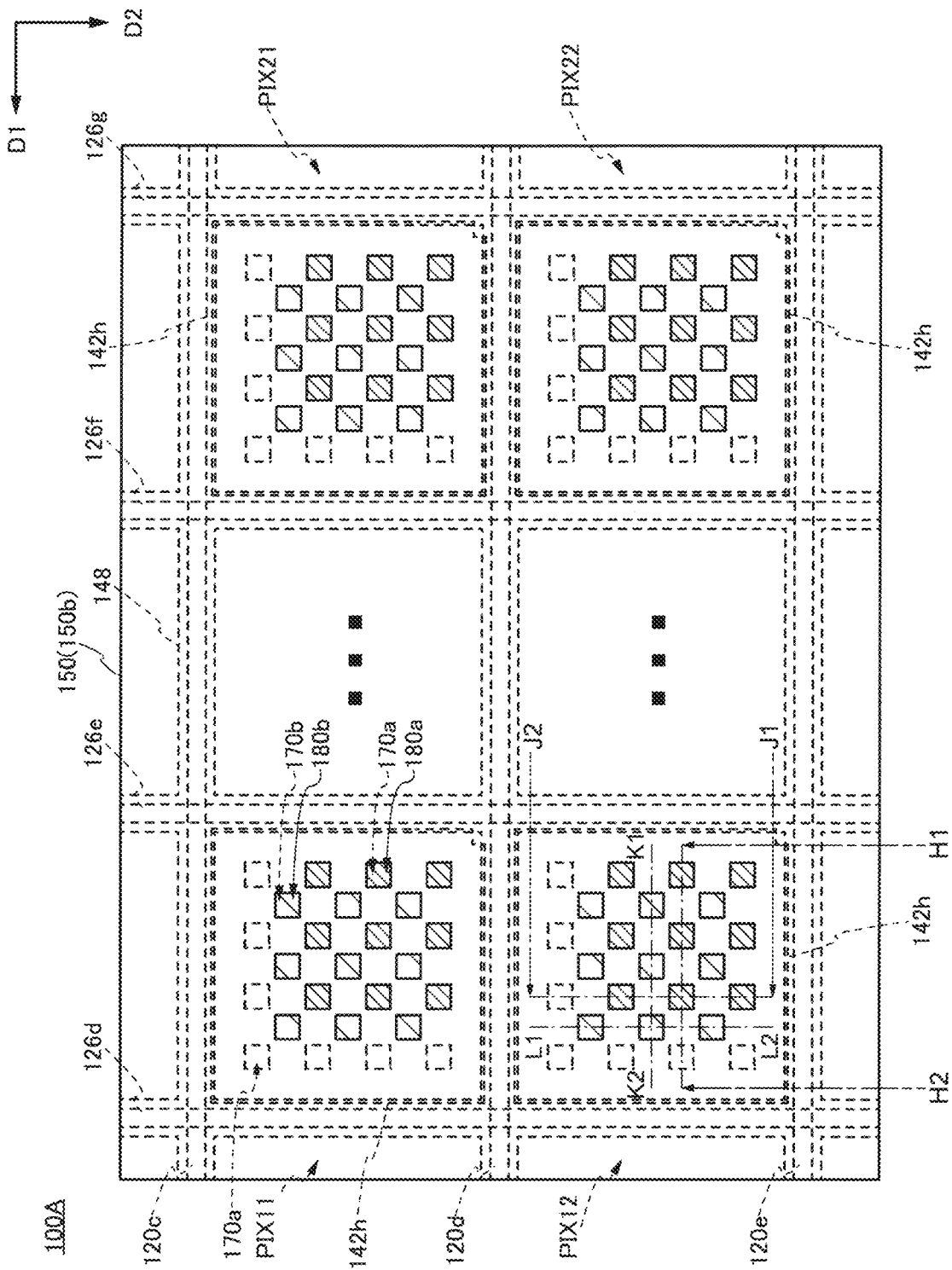
FIG. 15 is an enlarged plan view of part of a display region of a display device according to the second embodiment.
Figure 16:
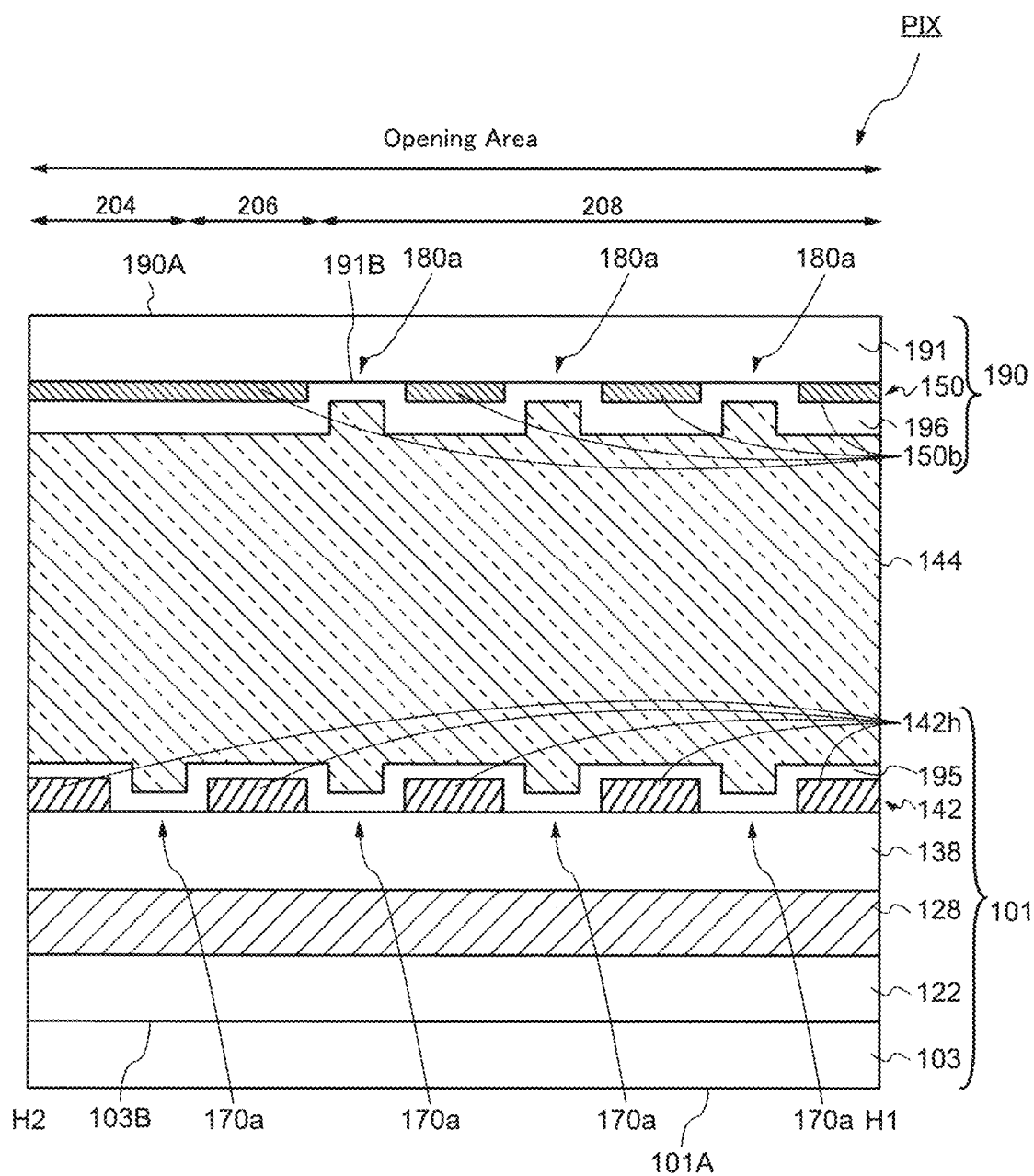
FIG. 16 is a cross-sectional view showing a cross-sectional structure of a display panel along a line H1-H2 of FIG. 15.
Figure 17:
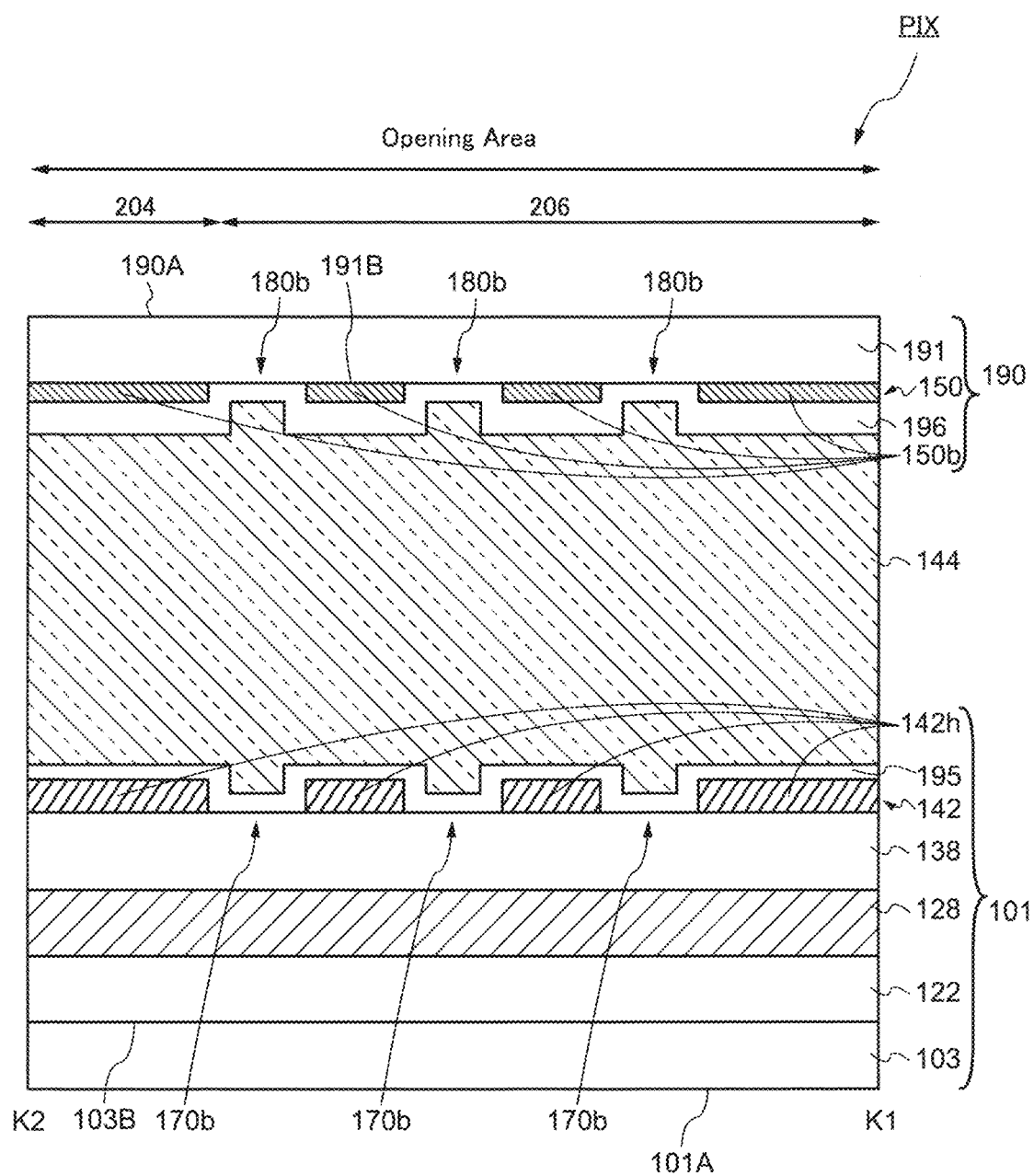
FIG. 17 is a cross-sectional view showing a cross-sectional structure of a display panel along a line K1-K2 of FIG. 15.

An opening in the second embodiment is arranged in both the pixel electrode layer and the common electrode layer of the display panel. The second embodiment is different from the first embodiment in that an opening is arranged in the common electrode layer 150. That is, an opening in the second embodiment is arranged in both the pixel electrode 142h and the common electrode layer 150, and other points are the same as those in the first embodiment. In the explanation of the second embodiment, differences from the first embodiment will be explained with reference to FIG. 13A to FIG. 17. FIG. 13A is an enlarged plan view of the vicinity of the common electrode layer 150 (a common electrode 150b) corresponding to one pixel PIX in the display region 102 of a display panel 100A of a display device 10A according to the second embodiment. FIG. 13B shows an enlarged plan view of the vicinity of one pixel PIX in the display region 102 of the display panel 100A. FIG. 14 and FIG. 15 are enlarged plan views of part of the display region 102 of the display panel 100A. FIG. 16 is a cross-sectional view showing a cross-sectional structure of the display panel 100A along a line H1-H2 of FIG. 15. FIG. 17 is a cross-sectional view showing a cross-sectional structure of the display panel 100A along a line K1-K2 of FIG. 15. Descriptions of the same or similar configurations as those in FIG. 1 to FIG. 12A and FIG. 12B may be omitted.

Basic configurations of the common electrode layer 150, the common electrode 150b, a plurality of openings 180a and a plurality of openings 180b, and the opening 170a and the opening 170b of the pixel electrode 142h will be described with reference to FIG. 13A and FIG. 13B.

FIG. 13A is an enlarged plan view of the vicinity of the common electrode layer 150 (the common electrode 150b) corresponding to one pixel PIX in the display region 102 of the display panel 100A of the display device 10A according to the second embodiment. As shown in FIG. 13A, the common electrode layer 150 includes the common electrode 150b, the plurality of openings 180a, and the plurality of openings 180b. The arrangement of the plurality of openings 180a and the plurality of opening 180b is similar to the arrangement in which the opening 170a and the opening 170b of the pixel electrode 142h shown in FIG. 12A are shifted in the direction D1 and the direction D2 by the distance DSX and the distance DSY. In addition, for the plurality of openings 180a and the plurality of openings 180b that are arranged to be shifted as described above, the opening 180b that is arranged on the right side in the first direction D1 and the opening 180b that is arranged on the lower side in the second direction D2 are eliminated in the arrangement shown in FIG. 13A. The interval DHX, the interval DHY, the length DLX, the length DLY, the distance DSX, and the distance DHY are the same with respect to the arrangement of the opening 170a and the opening 170b of the pixel electrode 142h shown in FIG. 12A, and it is the arrangement of the checkered pattern in the arrangement of the plurality of openings 180a and the plurality of opening 180b. In addition, each of the plurality of openings 180a and the plurality of openings 180b is referred to as a second opening.

The common electrode layer 150 corresponding to one pixel PIX and including the common electrode 150b, the plurality of openings 180a, and the plurality of openings 180b is referred to as a first opening group 182, in the display device 10A. Similar to the display device 10, the plurality of pixels PIX is arranged in a matrix in the first direction D1 and the second direction D2, in the display device 10A. Therefore, the plurality of first opening groups 182 is also arranged in a matrix in the first direction D1 and the second direction D2. The pixel PIX includes the first opening group 182. Each aperture ratio of the plurality of pixels PIX is the same in the second embodiment similar to the first embodiment. That is, the number of each of the openings of the plurality of pixels PIX is the same (uniform), and the (total) area of each of the openings of the plurality of pixels PIX is the same. For example, the aperture ratio in the second embodiment refers to the ratio of the overlapping part of the plurality of openings 180a and the plurality of openings 170a (FIG. 13B) and the overlapping part of the plurality of openings 180b and the plurality of openings 170b (FIG. 13B) to the entire area of the common electrode layer 150. For example, the aperture ratio is calculated by the following formula. In the following formula, the area of the common electrode where the plurality of openings 180a and the plurality of openings 180b are not arranged is, in other words, the area of differences between the area of the part where the plurality of openings 180a overlaps the plurality of openings 170a (FIG. 13B), the part where the plurality of openings 180b overlaps the plurality of openings 170b (FIG. 13B), and the area of the common electrode.

> Aperture ratio=(area of a part where the plurality of openings 180a overlaps the plurality of openings 170a and a part where the plurality of opening portions 180b overlaps the plurality of openings 170b/area of the common electrode without the plurality of openings 180a and the plurality of openings 180b)×100

As shown in FIG. 13B, focusing on the vicinity of one pixel PIX in the display region 102 of the display panel 100A of the display device 10A, the display device 10A (the display panel 100A and the display region 102) includes a first region 204, a second region 206, and a third region 208. The first opening group 182 includes the first region 204, the second region 206, and the third region 208.

The first region 204 includes the pixel electrode 142h, the plurality of openings 170a, and the common electrode 150b, and does not include the opening 170b, the opening 180a, and the opening 180b. In the first region 204, the plurality of openings 170a overlaps the common electrode 150b, and the pixel electrode 142h overlaps the common electrode 150b.

The second region 206 includes the pixel electrode 142h, the common electrode 150b, the opening 170b, and the opening 180b, and does not include the opening 170a and the opening 180a. In the second region 206, the opening 170b overlaps the opening 180b, and the pixel electrode 142h overlaps the common electrode 150b. In addition, a part of the opening 170b may overlap the common electrode 150b, and a part of the opening 180b may overlap the pixel electrode 142h.

The third region 208 includes the pixel electrode 142h, the common electrode 150b, the opening 170a, and the opening 180a, and does not include the opening 170b and the opening 180b. In the third region 208, the opening 170a overlaps the opening 180a, and the pixel electrode 142h overlaps the common electrode 150b. In addition, a part of the opening 170a may overlap the common electrode 150a, and a part of the opening 180a may overlap the pixel electrode 142h.

Next, basic configurations of the common electrode layer 150, the common electrode 150b, the plurality of openings 180a, the plurality of openings 180b, and the opening 170a and the opening 170b of the pixel electrode 142h in the display region 102 of the display panel 100A will be described with reference to FIG. 14 and FIG. 15.

Since the configuration of the display panel 100A shown in FIG. 14 is the same as the configuration in which the pixel electrodes 142b to 142e in which the plurality of openings 170 shown in FIG. 5 is arranged is replaced with the pixel electrode 142f in which the plurality of openings 170a and the plurality of 170b are arranged, detailed explanations will be omitted.

The configuration of the display panel 100A shown in FIG. 15 is the same as the configuration in which the common electrode layer 150 not including the opening shown in FIG. 6 is replaced with the common electrode layer 150 including the common electrode 150b, the plurality of openings 180a, and the plurality of 180b. Since the description of the common electrode layer 150 including the common electrode 150b, the plurality of openings 180a, and the plurality of 180b is as described above, detailed explanations will be omitted.

As shown in a plan view of FIG. 14 and FIG. 15, the plurality of openings 170a and the plurality of openings 170b in a pixel electrode 147h arranged in the pixel PIX and the common electrode 150b including the plurality of openings 180a and the plurality of openings 180b arranged in the pixel PIX are arranged in a matrix at the same pitch as the pixel PIX, in the display device 10A (the display panel 100A).

Next, a cross-sectional structure of the pixel PIX will be described with reference to FIG. 16 and FIG. 17. As shown in FIG. 16, the opening 170a overlaps the common electrode 150b in the first region 204, and the pixel electrode 142h overlaps the common electrode 150b in the first region 204. The opening is not arranged in the second region 206, and the pixel electrode 142h overlaps the common electrode 150b in the second region 206. The opening 170a overlaps the opening 180a in the third region 208, and the pixel electrode 142h overlaps the common electrode 150b in the third region 208.

As shown in FIG. 17, the opening is not arranged, and the pixel electrode 142*h* overlaps the common electrode 150*b* in the first region 204. The opening 170*b* overlaps the opening 180*b* in the second region 206, and the pixel electrode 142*h* overlaps the common electrode 150*b* in the second region 206.

Further, the cross section taken along a line J1-J2 shown in FIG. is the same as the cross section taken along a line H1-H2 shown in FIG. 16, and the cross section taken along a line L1-L2 shown in FIG. is the same as the cross section taken along a line K1-K2 shown in FIG. 17, so that the explanations will be omitted.

As described above, each of the plurality of pixels PIX includes the pixel electrode 142*h* in which the plurality of openings 170*a* and the plurality of openings 170*b* are arranged, and the common electrode 150*b* in which the plurality of openings 180*a* and the plurality of openings 180*b* are arranged, in the display device 10A (the display panel 100A). That is, the plurality of openings 170*a*, the plurality of openings 170*b*, the plurality of openings 180*a*, and the plurality of openings 180*b* are arranged in the region defined as the pixel PIX. The ratio occupied by the plurality of openings 170*a*, the plurality of openings 170*b*, the plurality of openings 180*a*, and the plurality of openings 180*b* is constant in each of the plurality of pixels PIX. Therefore, as in the configuration described in "1-1-5. Configuration of Pixel Electrode 142*a*", the entire display region 102 can have uniform transparency. Further, arranging the plurality of openings 170*a*, the plurality of openings 170*b*, the plurality of openings 180*a*, and the plurality of openings 180*b* in the region defined as the pixel PIX at a constant rate makes it possible to reduce the light absorption loss due to the pixel electrode 142*h* and the common electrode 150*b*.

Specifically, since the pixel electrode layer 142 and the common electrode layer 150 are formed of a transparent conductive material, it is possible to reduce the rate at which the light transmitted through the region defined as the pixel PIX is absorbed by the transparent conductive material, in the display device 10A (the display panel 100A). As a result, the transparency of the display region 102 can be increased. Further, the rate at which the light L1 emitted from the lighting equipment 300 passes through the region defined as the pixel PIX is even higher than when no opening is arranged in both the pixel electrode layer 142 and the common electrode layer 150, in the transparent state of the display panel 100A. As a result, the brightness of the light L3 and the light L4 in the scattering state described with reference to FIG. 2 can be increased as compared with the case where the opening is not arranged in both the pixel electrode layer 142 and the common electrode layer 150, in the display panel 100A.

3. Third Embodiment

Figure 18A:
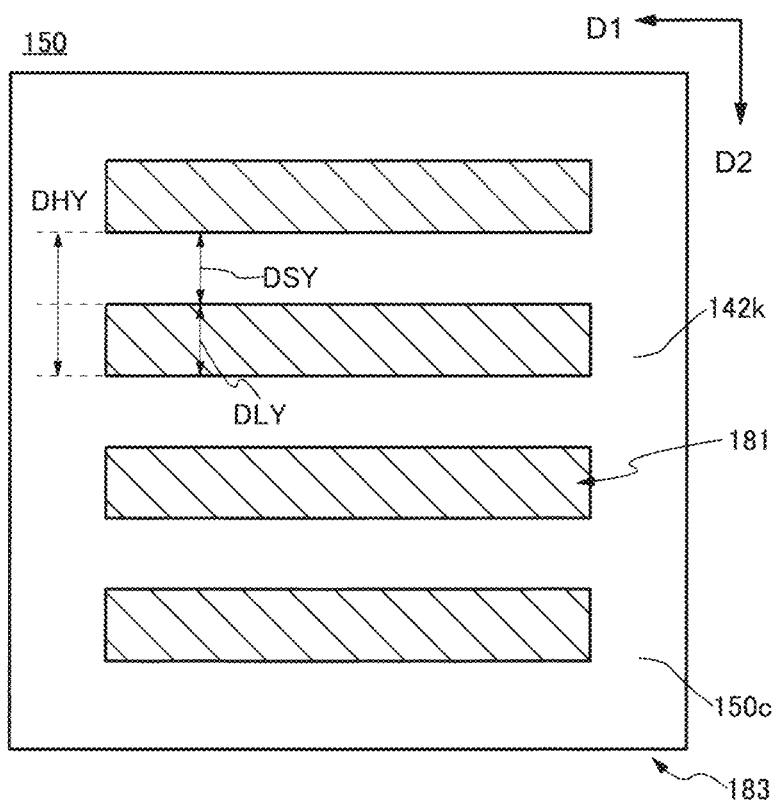
FIG. 18A is an enlarged plan view of a vicinity of a common electrode layer corresponding to one pixel in a display region of a display panel of a display device according to a third embodiment.
Figure 18B:
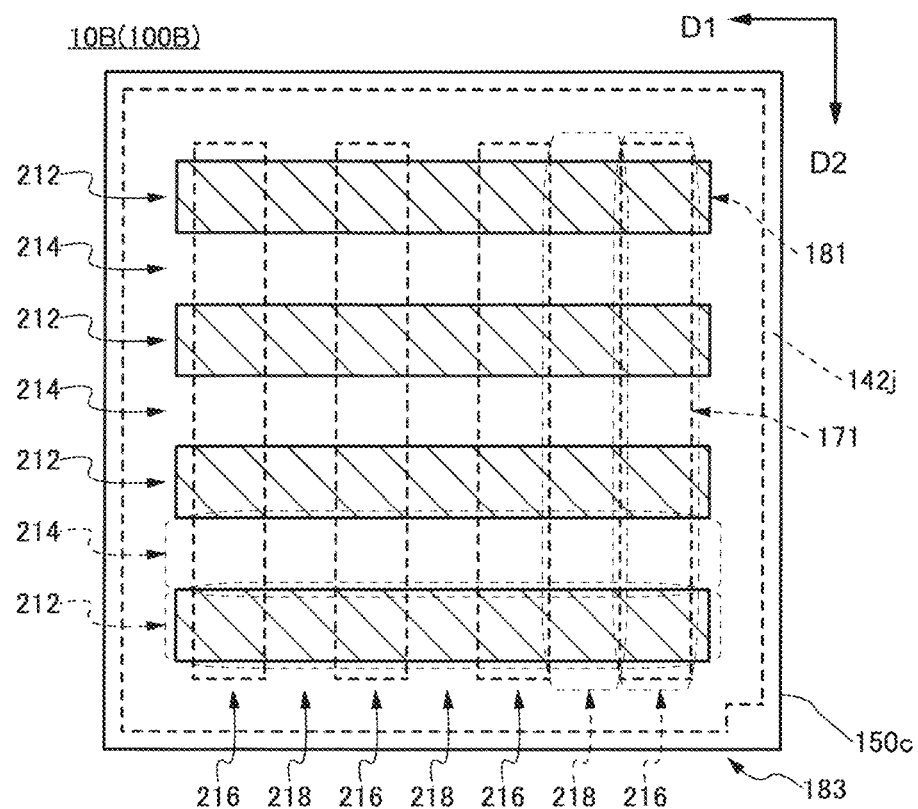
FIG. 18B is an enlarged plan view of a vicinity of one pixel in a display region of a display panel.
Figure 19:
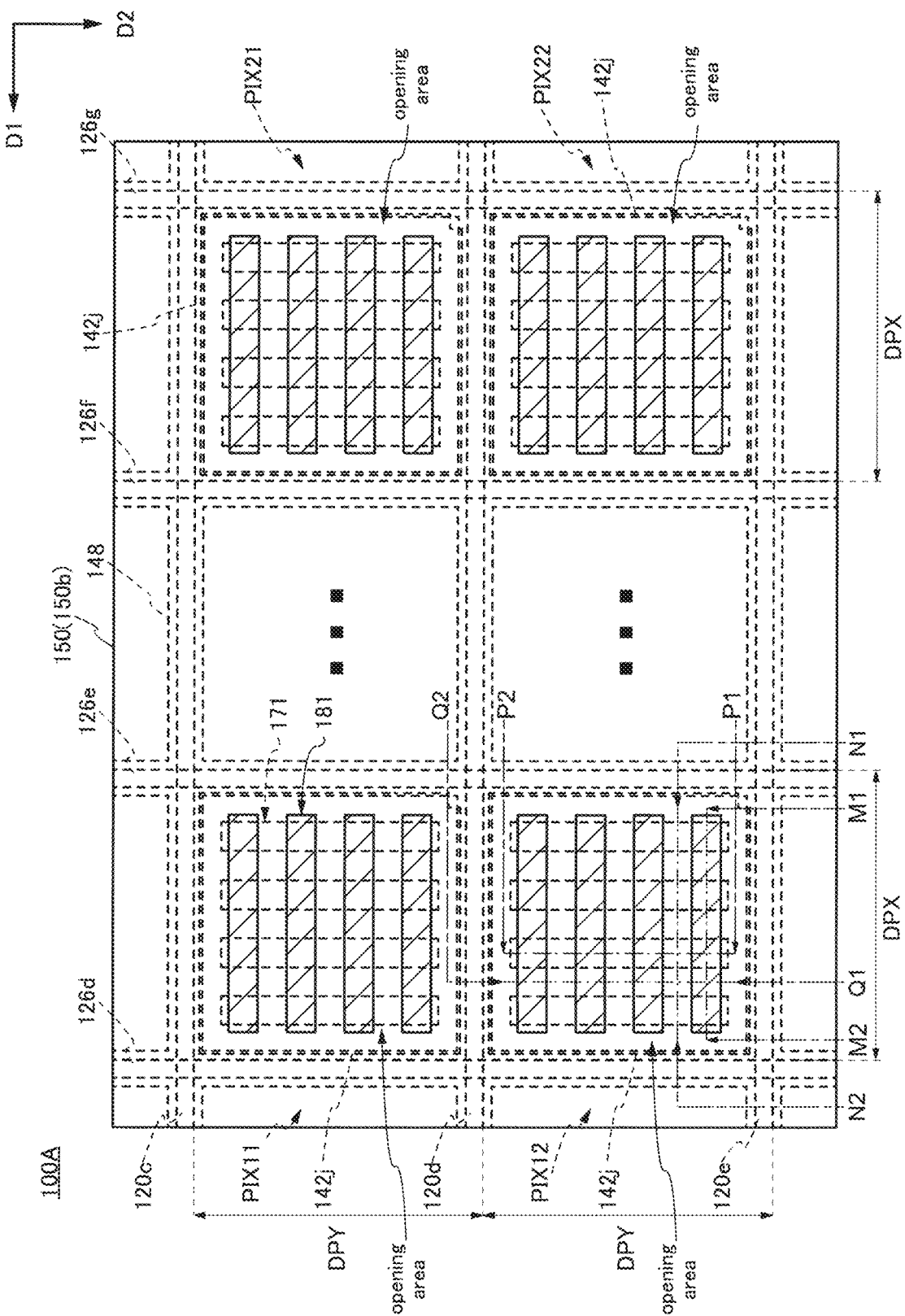
FIG. 19 is an enlarged plan view of part of a display region of a display panel according to the third embodiment.
Figure 20:
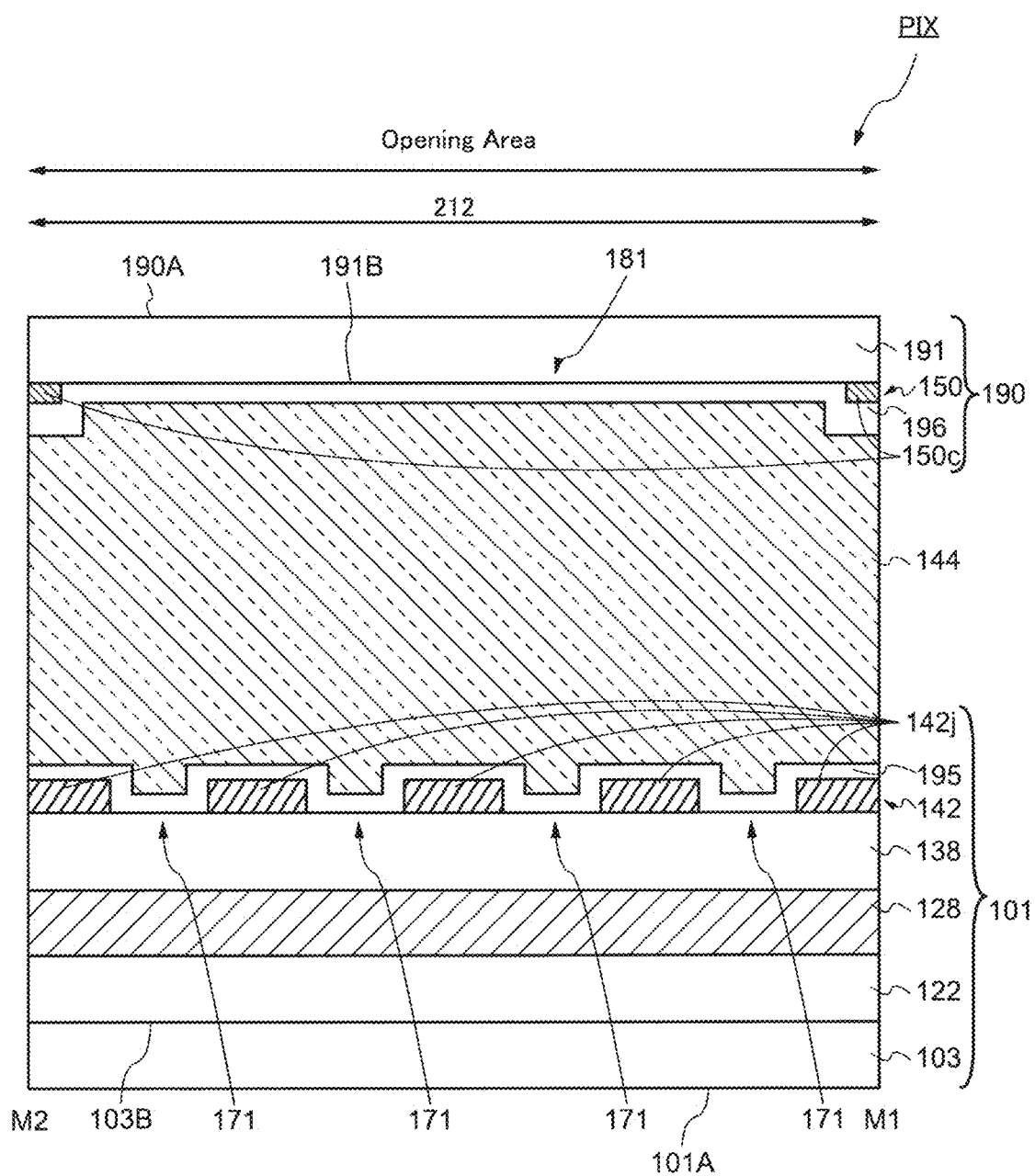
FIG. 20 is a cross-sectional view showing a cross-sectional structure of a display panel along a line M1-M2 of FIG. 19.
Figure 21:
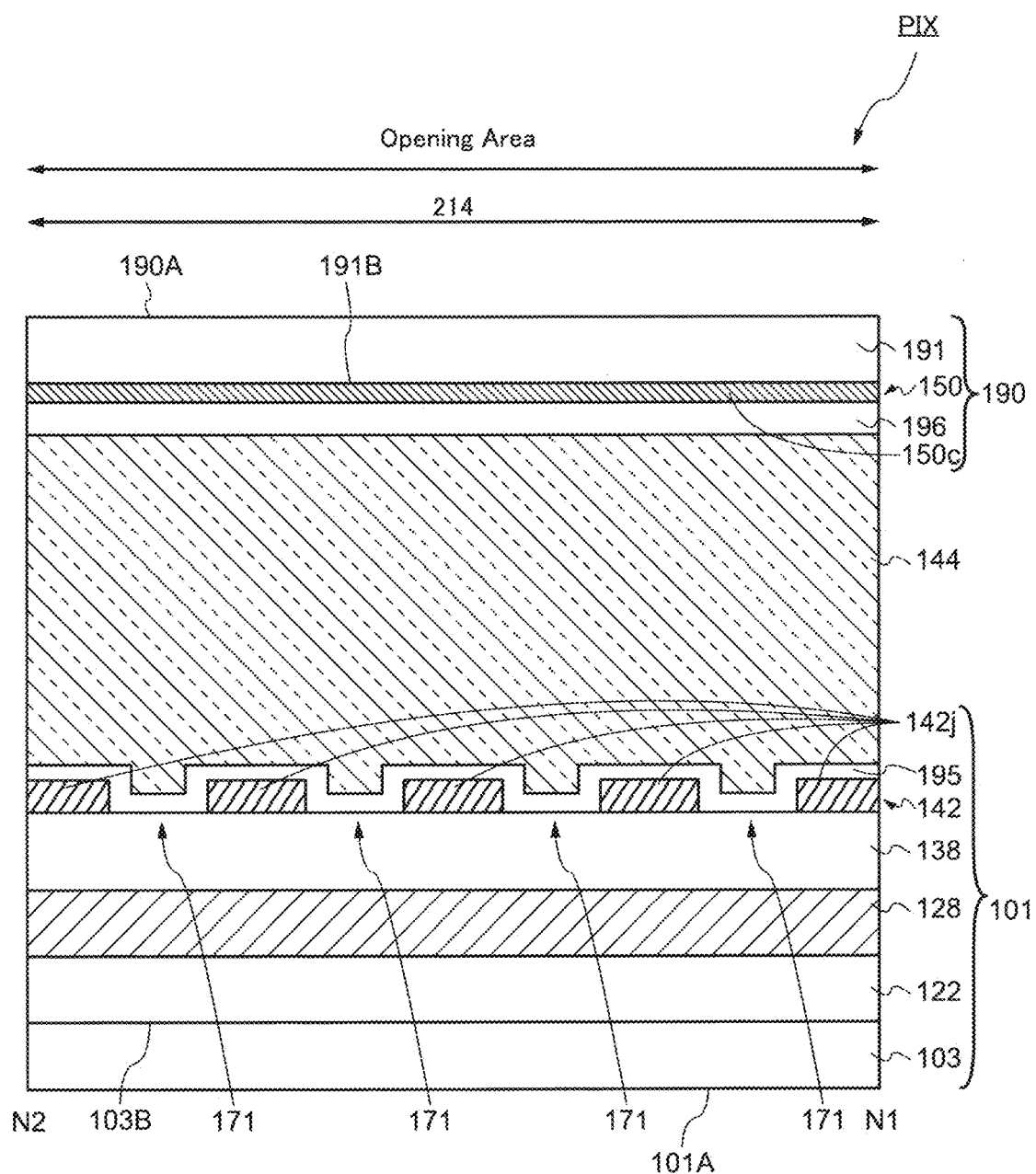
FIG. 21 is a cross-sectional view showing a cross-sectional structure of a display panel along a line N1-N2 of FIG. 19.
Figure 22:
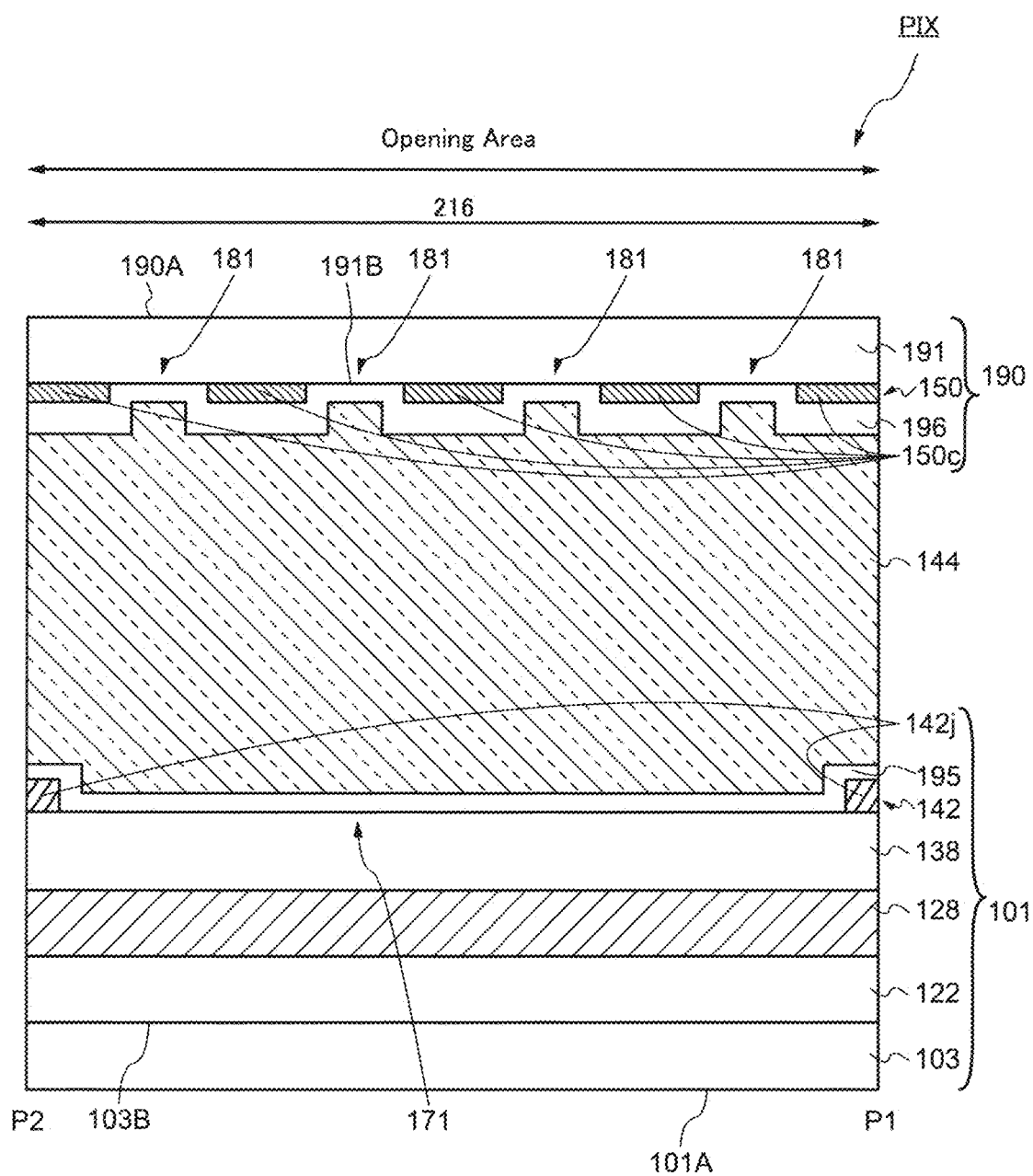
FIG. 22 is a cross-sectional view showing a cross-sectional structure of a display panel along a line P1-P2 of FIG. 19.
Figure 23:
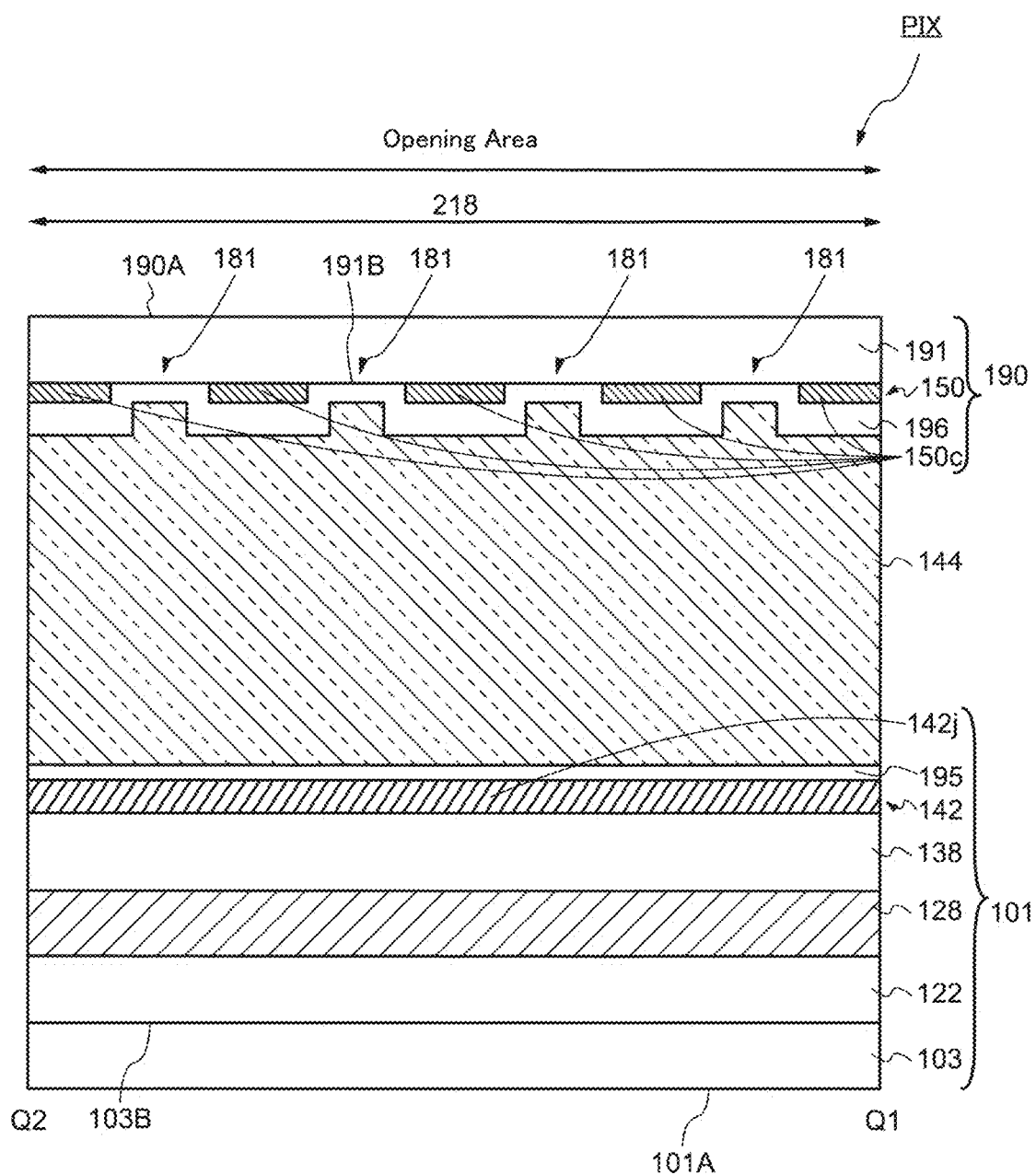
FIG. 23 is a cross-sectional view showing a cross-sectional structure of a display panel along a line Q1-Q2 of FIG. 19.

An opening in a third embodiment is arranged in both the pixel electrode layer and the common electrode layer of the display panel. The third embodiment is different from the second embodiment in a configuration of an opening arranged in both the pixel electrode layer 142 and the common electrode layer 150. Other points in the third embodiment are the same as those in the second embodiment. In the explanation of the third embodiment, differences from the second embodiment will be explained with reference to FIG. 18A to FIG. 21. FIG. 18A is an enlarged plan view of the vicinity of the common electrode layer 150 (a common electrode 150*c*) corresponding to one pixel PIX of the display region 102 of a display panel 100B of a display device 10B according to the third embodiment. FIG. 18B is an enlarged plan view of the vicinity of one pixel PIX in the display region 102 of the display panel 100B. FIG. 19 is an enlarged plan view of part of the display region 102 of the display panel 100B. FIG. 20 is a cross-sectional view showing a cross-sectional structure of the display panel 100B along a line M1-M2 of FIG. 19. FIG. 21 is a cross-sectional view showing a cross-sectional structure of the display panel 100B along a line N1-N2 of FIG. 19. FIG. 22 is a cross-sectional view showing a cross-sectional structure of the display panel 100B along a line P1-P2 of FIG. 19. FIG. 23 is a cross-sectional view showing a cross-sectional structure of the display panel 100B along a line Q1-Q2 of FIG. 19. Descriptions of the same or similar configurations as those in FIG. 1 to FIG. 17 may be omitted.

Basic configurations of the common electrode layer 150, the common electrode 150*c*, a plurality of openings 181, and the opening 171 of the pixel electrode 142*j* will be described with reference to FIG. 18A and FIG. 18B.

FIG. 18A shows an enlarged plan view of the vicinity of the common electrode layer 150 (the common electrode 150*c*) corresponding to one pixel PIX in the display region 102 of the display panel 100B of the display device 10B. As shown in FIG. 18A, the common electrode layer 150 includes the common electrode 150*c* and the plurality of openings 181. The arrangement of the plurality of openings 181 is similar to the arrangement in which the opening 171 of the pixel electrode 142*j* shown in FIG. 12B is rotated by 90 degrees. The arrangement of the plurality of openings 181 is the same as the arrangement in which the interval DHX, the length DLX, and the distance DSX of the opening 171 of the pixel electrode 142*j* shown in FIG. 12B is replaced with the interval DHY, the length DLY, and the distance DSY.

The common electrode layer 150 corresponding to one pixel PIX and including the common electrode 150*c* and the plurality of openings 181 is referred to as a second opening group 183, in the display device 10B. The plurality of pixels PIX is arranged in a matrix in the first direction D1 and the second direction D2 in the display device 10B similar to the display device 10. Therefore, the plurality of second opening groups 183 is also arranged in a matrix in the first direction D1 and the second direction D2. The pixel PIX may include the second opening group 183, and the aperture ratio of each of the plurality of pixels PIX is the same.

As shown in FIG. 18B, focusing on the vicinity of one pixel PIX in the display region 102 of the display panel 100B of the display device 10B, the display device 10B (the display panel 100B and the display region 102) includes a fourth region 212, a fifth region 214, a sixth region 216, and a seventh region 218. The second opening group 183 includes the fourth region 212, the fifth region 214, the sixth region 216, and the seventh region 218.

The fourth region 212 includes the pixel electrode 142*j*, the plurality of openings 171, and the opening 181. The plurality of openings 171 overlaps the opening 181 in the fourth region 212, and the pixel electrode 142*j* overlaps the opening 181 in the fourth region 212. In addition, a part of the opening 171 may overlap the common electrode 150*c*.

The fifth region 214 includes the pixel electrode 142*j*, the common electrode 150*c*, and the opening 171, and does not include the opening 181. In the fifth region 214, the plurality of openings 171 overlaps the common electrode 150*c*, and the pixel electrode 142*j* overlaps the common electrode 150*c*.

The sixth region 216 includes the pixel electrode 142*j*, the common electrode 150*c*, the opening 171, and the opening 181. The plurality of openings 171 overlaps the opening 181 in the sixth region 216, and the pixel electrode 142*j* overlaps the common electrode 150*c* in the sixth region 216. In addition, a part of the opening 171 may overlap the common electrode 150*c*.

The seventh region 218 includes the pixel electrode 142*j*, the common electrode 150*c*, and the opening 181. The opening 181 overlaps the pixel electrode 142*j* in the seventh region 218, and the pixel electrode 142*j* overlaps the common electrode 150*c* in the seventh region 218.

The fourth region 212 and the fifth region 214 are alternately arranged in the second direction D2, and the sixth region 216 and the seventh region 218 are alternately arranged in the first direction D1.

Next, basic configurations of the common electrode layer 150, the common electrode 150*c*, the plurality of openings 181, and the opening 171 in the display region 102 of the display panel 100B will be described with reference to FIG. 19.

A configuration of the display panel 100B shown in FIG. 19 is similar to the configuration in which the pixel electrode layer 142 including the pixel electrodes 142*b* to 142*e* shown in FIG. 14 or FIG. 15 and the plurality of openings 170*a* and the plurality of openings 170*b* is replaced with a pixel electrode layer 412 including the pixel electrode 142*f* and the plurality of openings 171. The pixel electrode layer 412 including the pixel electrode 142*f* and the plurality of openings 171 is the same as the configuration in "1-1-8. Second Modification of Opening" described with reference to FIG. 12B.

In addition, the configuration of the display panel 100B shown in FIG. 19 is the same as the configuration in which the common electrode layer 150 including the common electrode 150*b*, the plurality of openings 180*a*, and the plurality of 180*b* shown in FIG. 14 or FIG. 15 is replaced with the common electrode layer 150 including the plurality of openings 181 and the common electrode 150*c*. Since the description of the common electrode layer 150 including the plurality of openings 181 and the common electrode 150*c* is the same as the description using FIG. 18B, the detailed descriptions will be omitted.

As shown in FIG. 19, in the display device 10B (the display panel 100B), in a plan view, the plurality of openings 171 in a pixel electrode 147*j* arranged in the pixel PIX and the plurality of openings 181 and the common electrode 150*c* arranged in the pixel PIX are arranged in a matrix at the same pitch as the pixel PIX.

Next, a cross-sectional structure of the pixel PIX will be described with reference to FIG. 20 to FIG. 23. As shown in FIG. 20, in the fourth region 212, the opening 171 overlaps the opening 181 and the common electrode 150*c*, the pixel electrode 142*j* overlaps the opening 181, and the pixel electrode 142*j* overlaps the common electrode 150*c*. As shown in FIG. 21, in the fifth region 214, the opening 181 is not arranged, the opening 171 overlaps the common electrode 150*c*, and the pixel electrode 142*j* overlaps the common electrode 150*c*. As shown in FIG. 22, in the sixth region 216, the opening 171 overlaps the opening 181 and the common electrode 150*c*, and the pixel electrode 142*j* overlaps the common electrode 150*c*. As shown in FIG. 23, in the seventh region 218, the opening 171 is not arranged, and the pixel electrode 142*j* overlaps the opening 181 and the common electrode 150*c*.

As described above, the opening is arranged in both the pixel electrode layer 142 and the common electrode layer 150, and parts of the openings arranged in each overlap, in the display device 10B (the display panel 100B) according to the third embodiment. The opening 171 and the opening 181 are not a collection of small openings, but slits having a large area. Therefore, the area of the pixel electrode layer 142 in the display device 10B (the display panel 100B) is smaller than in the case where a plurality of small openings is arranged. As a result, the rate at which the light L1 emitted from the lighting equipment 300 is transmitted through the region defined as the pixel PIX is higher than in the case where the plurality of small openings is arranged, in the transparent state of the display panel 100B.

Although the present invention has been described above with reference to the drawings, the present invention is not limited to the embodiments described above and can be modified as appropriate without departing from the spirit of the present invention. For example, the addition, deletion, or design change of components as appropriate by those skilled in the art based on a display device of the present embodiment are also included in the scope of the present invention as long as they are provided with the gist of the present invention. Furthermore, each of the embodiments described above can be appropriately combined as appropriate as long as no contradiction is caused, and technical matters common to each embodiment are included in each embodiment even if not explicitly described.

Further, it is understood that, even if the effect is different from those provided by each of the above-described embodiments, the effect obvious from the description in the specification or easily predicted by persons ordinarily skilled in the art is apparently derived from the present invention.

What is claimed is:

1. A display device comprising:
    a pixel electrode layer arranged with a plurality of pixel electrodes in a first direction and a second direction crossing the first direction;
    a first substrate including a first surface and a second surface arranged with the pixel electrode layer;
    a second substrate including a third surface facing to the second surface;
    a common electrode layer arranged on the third surface;
    a liquid crystal layer arranged between the common electrode layer and the pixel electrode layer;
    a plurality of pixels arranged in the first direction and the second direction; and
    wherein
    each of the plurality of pixel electrodes is arranged with a plurality of first openings,
    each of the plurality of pixels is disposed corresponding to each of the plurality of pixel electrodes, and
    a number of first openings is the same for each of the plurality of pixels,
    an area of each of the plurality of first openings is the same for each of the plurality of pixels,
    each of the plurality of first openings is fully enclosed and aligned in the first direction or the second direction in a plan view,
    the common electrode layer includes a common electrode and a plurality of second openings arranged in the first direction and the second direction,
    the common electrode layer includes second opening groups,
    each of the second opening groups includes second openings overlapping the pixel electrode among the plurality of second openings,
    each of the second opening groups includes the common electrode overlapping the pixel electrode, the second opening groups are arranged in the first direction and the second direction at the same pitch as the pixel electrodes, each of the plurality of second openings included in each of the second opening groups is fully enclosed and aligned in the first direction or the second direction, all of the plurality of second openings included in each of the second opening groups are aligned in line in one direction different from any direction in which all of the plurality of first openings included in each of the plurality of pixel electrodes are aligned in line, in a plan view.

2. The display device according to claim 1, wherein
a length in one direction in each of the plurality of first openings is longer than a length in another direction in the each of the plurality of first openings.

3. The display device according to claim 1, wherein
each of the second opening groups includes a fourth region, a fifth region, a sixth region, and a seventh region, the plurality of first openings overlap the second openings and the common electrode, the pixel electrode overlaps the second openings, and the pixel electrode overlaps the common electrode in the fourth region, the first openings and the pixel electrode overlap the common electrode in the fifth region, the first openings overlap the second openings and the common electrode, and the pixel electrode overlaps the common electrode in the sixth region, and the pixel electrode overlaps the second openings and the common electrode in the seventh region.

4. The display device according to claim 1, wherein
the pixel electrode layer and the common electrode layer include a transparent conductive material.

5. The display device according to claim 4, wherein
the liquid crystal layer includes a polymer dispersed liquid crystal.

* * * * *